(12) United States Patent
Nasiri Khormuji

(10) Patent No.: US 12,015,514 B2
(45) Date of Patent: Jun. 18, 2024

(54) COMMUNICATION DEVICES FOR SHAPING SYMBOL CONSTELLATIONS

(71) Applicant: HUAWEI TECHNOLOGIES CO., LTD., Shenzhen (CN)

(72) Inventor: Majid Nasiri Khormuji, Kista (SE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 15 days.

(21) Appl. No.: 17/881,906

(22) Filed: Aug. 5, 2022

(65) Prior Publication Data

US 2022/0393930 A1 Dec. 8, 2022

Related U.S. Application Data

(63) Continuation of application No. PCT/EP2020/052938, filed on Feb. 6, 2020.

(51) Int. Cl.
*H04L 27/34* (2006.01)
*H04L 25/02* (2006.01)
(Continued)

(52) U.S. Cl.
CPC ...... *H04L 27/3411* (2013.01); *H04L 25/0202* (2013.01); *H04L 27/36* (2013.01); *H04L 27/38* (2013.01)

(58) Field of Classification Search
CPC . H04L 27/3411; H04L 25/0202; H04L 27/36; H04L 27/38; H04B 7/0604; H04B 7/0626
See application file for complete search history.

(56) References Cited

U.S. PATENT DOCUMENTS

2010/0322334 A1* 12/2010 Wang .............. H04L 5/0007
375/267
2013/0040684 A1* 2/2013 Yu ..................... H04L 1/189
455/517
(Continued)

FOREIGN PATENT DOCUMENTS

JP 2019521551 A 7/2019
WO WO-2016124219 A1 * 8/2016 ............. G01R 29/10

OTHER PUBLICATIONS

Naresh Yalagala et al.: "On Media-Based Modulation Using RF Mirrors", Jun. 1, 2017 (Jun. 1, 2017), pp. 1967-4983, XP011653992.
(Continued)

*Primary Examiner* — Jean B Corrielus
(74) *Attorney, Agent, or Firm* — HAUPTMAN HAM, LLP

(57) ABSTRACT

First and second communication devices shape symbol constellation in wireless transmissions. The first communication device obtains a second symbol constellation based on the first symbol constellation and the set of weights, where the first symbol constellation is based on a radiating pattern in a set of radiating patterns for the first communication device and the weights are derived based on the first symbol constellation. Thereafter, the set of antenna elements are controlled according to the radiating pattern for transmitting a set of information bits mapped onto the second symbol constellation. Thereby, the second symbol constellation is customized to the radio environment to enable smart radio that enjoys improved signal design and thereby better performance.

16 Claims, 19 Drawing Sheets

(51) Int. Cl.
*H04L 27/36* (2006.01)
*H04L 27/38* (2006.01)

(56) References Cited

U.S. PATENT DOCUMENTS

| | | | |
|---|---|---|---|
| 2013/0045690 A1* | 2/2013 | Seol | H04B 7/0628 455/63.4 |
| 2014/0037023 A1* | 2/2014 | Yang | H04L 27/0008 375/330 |
| 2020/0186397 A1* | 6/2020 | Tsatsanis | H04L 25/03292 |

OTHER PUBLICATIONS

Pillay Narushan et al.: "Quadrature spatial media-based modulation with RF mirrors", (Nov. 9, 2017), pp. 2440-2448, XP006064040.

A. K. Khandani, Media-based modulation: A new approach to wireless transmission, in Proc. IEEE ISIT 2013, Jul. 2013, pp. 3050-3054.

A. K. Khandani, Media-based modulation: Converting static Rayleigh fading to AWGN, in Proc. IEEE ISIT 2014, Jun.-Jul. 2014, pp. 1549-1553.

A. K. Khandani, Media-based modulation: A new approach to wireless transmission, Tech. Rep., University of Waterloo, Canada, 2013, total 5 pages.

E. Seifi, M. Atamanesh, and A. K. Khandani, Media-based modulation: A new frontier in wireless communications, Nov. 2015, total 27 pages.

E. Basar, Media-based modulation for future wireless systems: A tutorial, Nov. 2018.total 7 pages.

E. Seifi, M. Atamanesh, and A. K. Khandani, Media-based Mimo: A New Frontier in Wireless Communications 2015. total 26 pages.

International Search Report and Written Opinion issued in corresponding International Application No. PCT/EP2020/052938, dated Oct. 26, 2020, pp. 1-14.

Japanese Office Action issued in corresponding Japanese Application No. 2022-547970, dated Dec. 5, 2023, pp. 1-15.

* cited by examiner

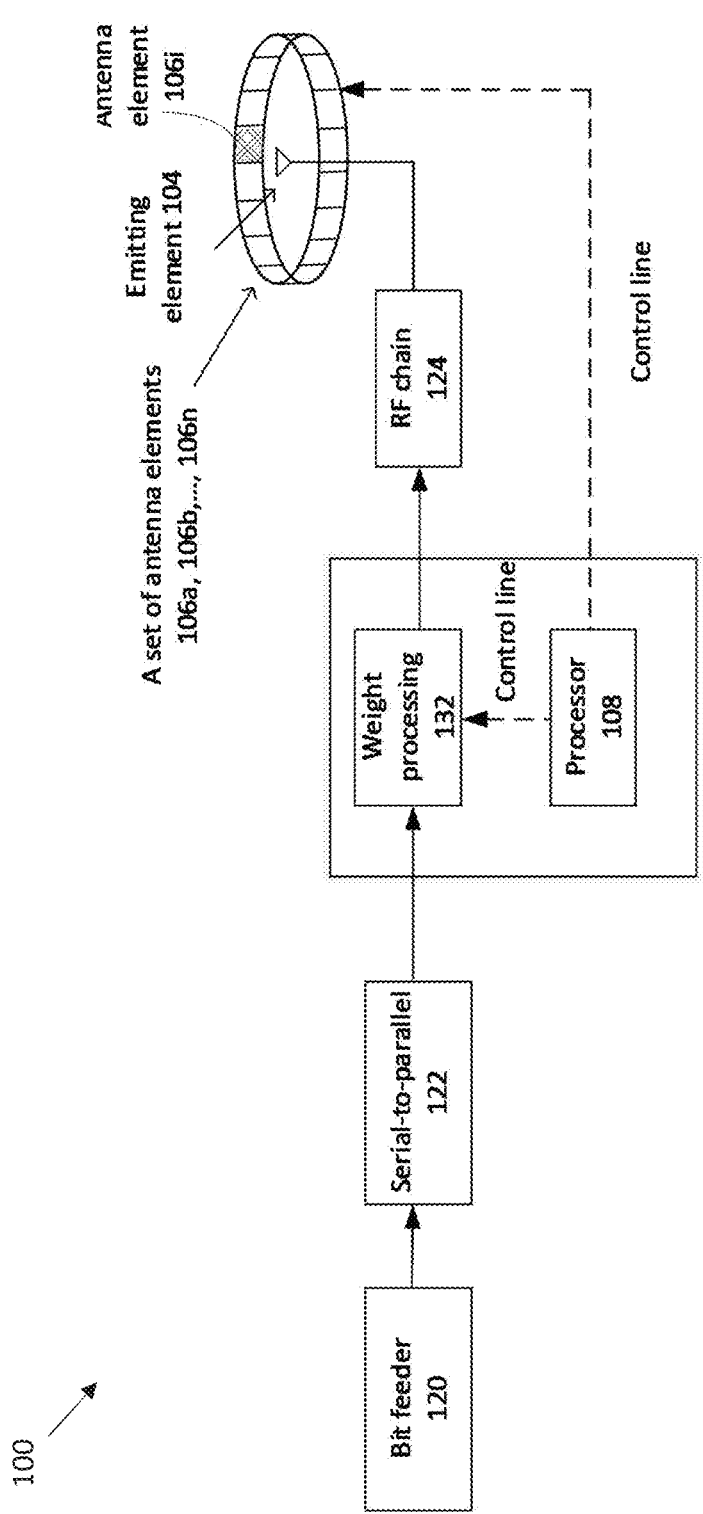

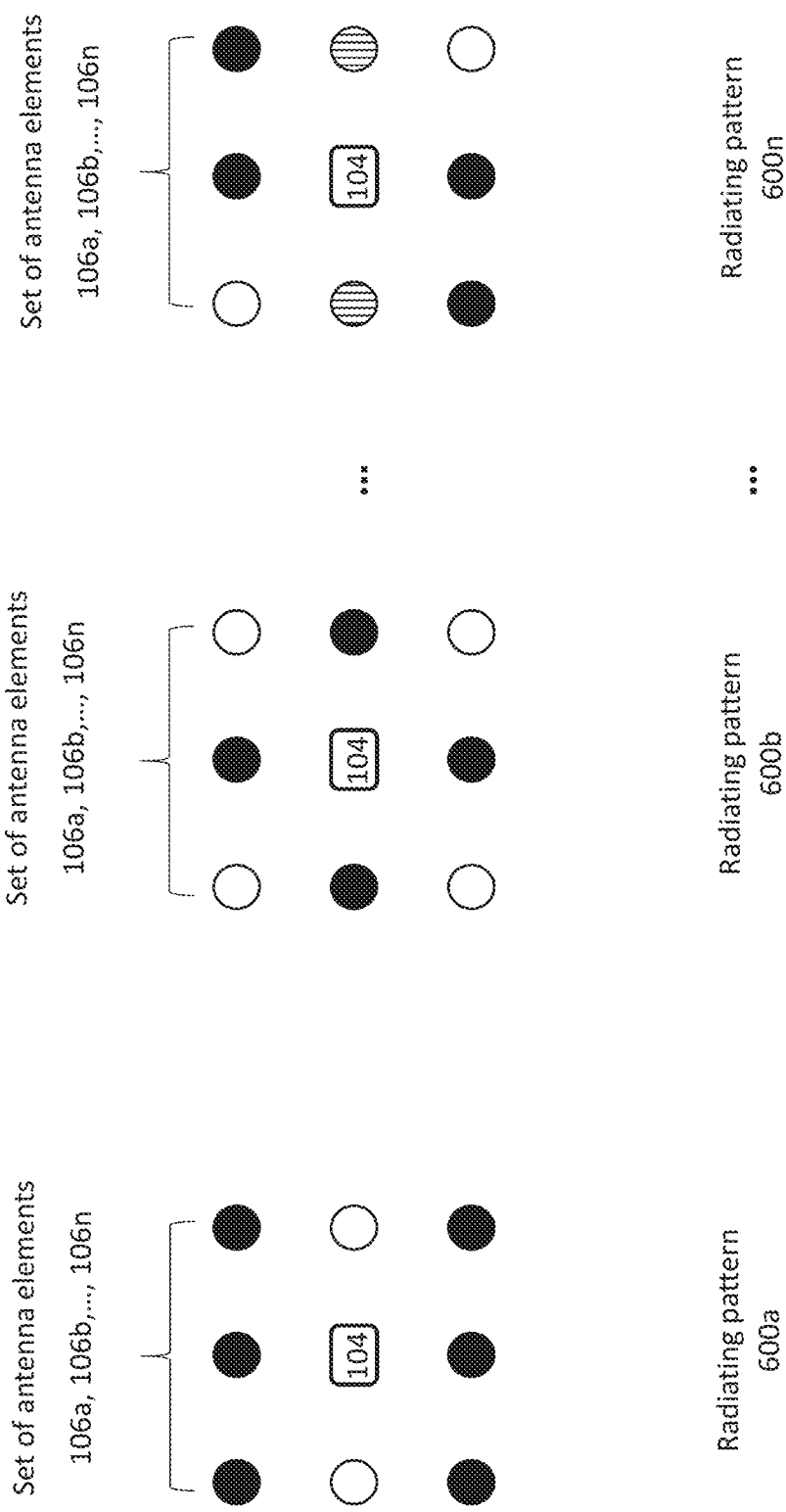

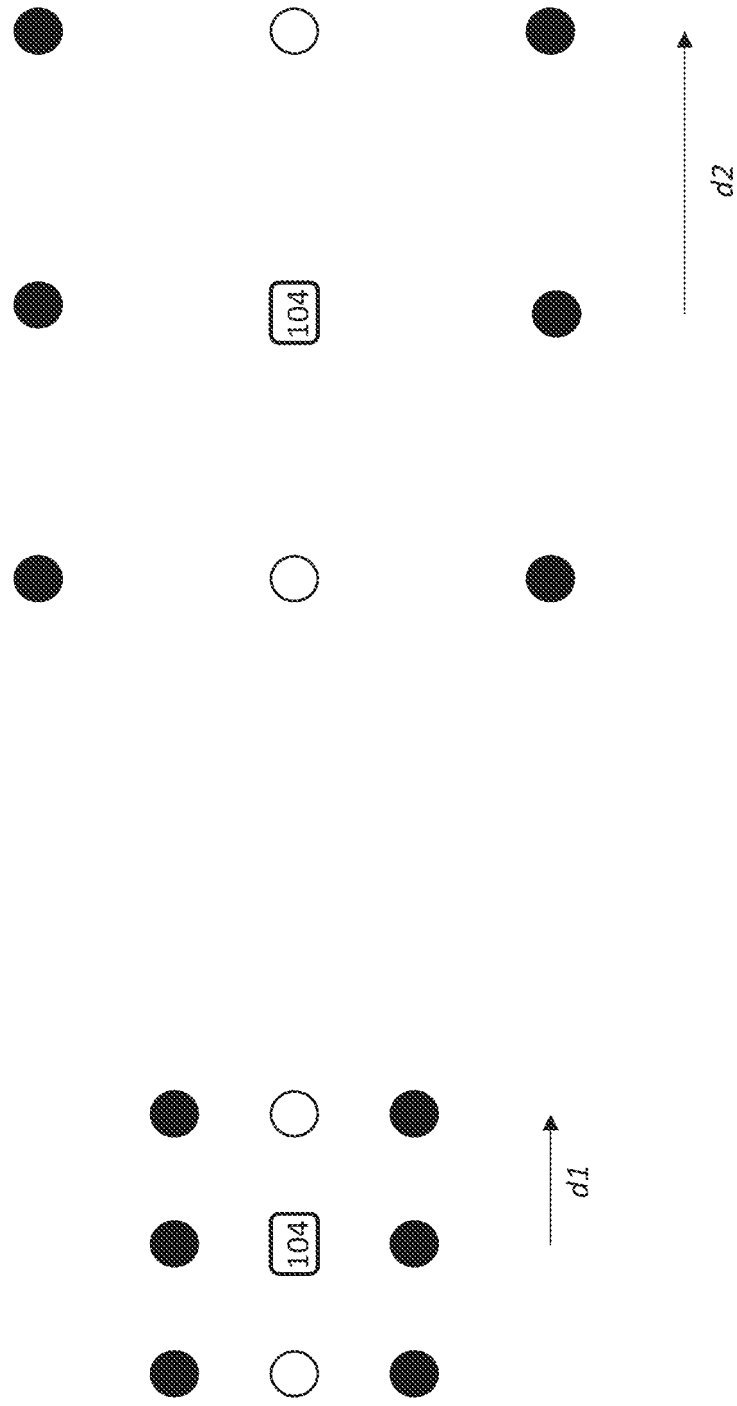

COMMUNICATION DEVICES FOR SHAPING SYMBOL CONSTELLATIONS

CROSS-REFERENCE TO RELATED APPLICATIONS

This application is a continuation of International Application No. PCT/EP2020/052938, filed on Feb. 6, 2020, the disclosure of which is hereby incorporated by reference in its entirety.

BACKGROUND

The usage of media to facilitate information transmission and reception has recently drawn some attentions, where an information-carrying signal on its way to its destination is manipulated to be enhanced such that a more reliable wireless link from the transmitter to the receiver is established. This hence enables smart radio environments with new additional degrees of freedom to further improve the network performance. In the smart radio environments, the environment is not a passive entity, but it is altered and customized to enhance the network capacity and the user experience. Toward this end, so-called mirrors, among other things, are used to enable a favorable signal manipulation. In this direction, the use of so called Radio Frequency (RF) mirrors mounted in the proximity or around transmit antenna(s) has enabled the so-called Media-Based Modulation (MBM). By using RF mirrors the transmit signal that is emitted will be shaped prior to the transmit signal reaching the destination. MBM has been proposed for beyond 5G wireless communication systems, e.g. for 6G. MBM emerges as an upcoming technology that is an alternative and/or supplementary to modern communication paradigms for beyond 5G networking.

Past solutions an antenna, which is connected to an RF chain, emits a radio wave at a given frequency. The transmit antenna is surrounded by a set of RF mirrors. The emitted signal will pass through the RF mirrors before departing toward the destinations. The information bits are passed to a mirror controller where based on the combination of input bits generates a signal that activates a mirror pattern that corresponds to the given subset of bits.

SUMMARY

At least one embodiment mitigates or solves the drawbacks and problems of past solutions.

The above and further objectives are solved by the subject matter of the independent claims. Further advantages are found in the dependent claims.

According to at least one embodiment, the above mentioned and other objectives are achieved with a first communication device comprising:

a set of antenna elements configured to operate in a set of radiating patterns; and a processor configured to obtain a first symbol constellation based on a radiating pattern in the set of radiating patterns, obtain a set of weights associated with the first symbol constellation, obtain a second symbol constellation based on the first symbol constellation and the set of weights, and control the set of antenna elements according to the radiating pattern for transmitting a set of information bits mapped onto the second symbol constellation.

Hence, the first communication device is also considered as a transmitter configured to transmit a set of information bits mapped onto the second symbol constellation, wherein the second symbol constellation is obtained based on the first symbol constellation and the set of weights.

A symbol constellation herein means a signal point selected from a set of signal points in a signal space where the signal space is partially generated by the environment. The signal points are the signal constellations. One example of the signal space is the two-dimensional complex plane for which the signal points are formed as In-phase and Quadrature (I/Q) mapping of the signal space in the complex plain. Higher and multi-dimensional signal constellations are also formed.

A radiating pattern is understood as directional (e.g., angular) dependence of the strength of the radio waves from the antenna elements either measured close to the antenna elements (e.g., near field) or close to the receiver (e.g., far field).

An advantage of the first communication device according to at least one embodiment is that the second symbol constellation is customized to the radio environment to enable smart radio that enjoys improved signal design and thereby better performance. The symbol shaping is enabled by weights. That is, the environment is controlled and adapted for data transmission.

In an implementation form of a first communication device according to at least one embodiment, an antenna element in the set of antenna elements is configured to operate in multiple radiating states so that the set of antenna elements operates in the set of radiating patterns.

In an implementation form of a first communication device according to at least one embodiment, the set of antenna elements is arranged within a range of an emitting element configured to emit a radio wave, and wherein the set of antenna elements is a set of radio frequency mirrors.

An emitting element is considered as means for emitting radio waves, e.g., RF signals. This is achieved, for example, by connecting an antenna to an RF chain which is a cascade of electronic components used to generate and transmit RF signals.

An advantage with this implementation form is that the final symbol space could be generated by an RF chain such that the symbol space is enlarged by the antenna elements receiving the RF signal from the emitting element. This in turn enables cheaper and more compact transmitter device. This also enable distributed allocation of the antenna elements.

In an implementation form of a first communication device according to at least one embodiment, obtain the first symbol constellation comprises receive a set of channel estimations from a second communication device, wherein channel estimation corresponds to a radiating pattern in the set of radiating patterns, compute the first symbol constellation based on a channel estimation in the set of channel estimations.

An advantage with this implementation form is that the first symbol constellation is formed, updated and optimized based on the channel variations which enables transmission with higher rate and higher reliability.

In an implementation form of a first communication device according to at least one embodiment, obtain the first symbol constellation comprises receive a set of reference signals associated with the set of radiating patterns from a second communication device, determine a set of channel estimations based on the received set of reference signals, wherein channel estimation corresponds to a radiating pattern in the set of radiating patterns, compute the first symbol constellation based on a channel estimation in the set of channel estimations; or receive the first symbol constellation from a second communication device.

An advantage with this implementation form is that feedback overhead from a second communication device to obtain the first symbol constellation is reduced.

In an implementation form of a first communication device according to at least one embodiment, compute the first symbol constellation comprises compute the first symbol constellation based on a channel estimation in the set of channel estimations and source based modulation.

Source-based modulation is understood as the modulation schemes that change the digital signal based on the information bits prior to the RF chain. Examples include M-ary Phase Shift Keying (e.g., BPSK and QPSK) and M-ary Quadrature Amplitude Modulation M-QAM (e.g., 16QAM and 64QAM).

An advantage with this implementation form is that the first symbol constellation is further enlarged using the joint symbol construction by using the radiation patterns as well as the source-based modulation. This results to an enhanced larger symbol constellations that enables higher rate transmissions. This also enables joint encoding of the radiation patterns and the information bits encoded by error correction codes.

In an implementation form of a first communication device according to at least one embodiment, obtain the set of weights comprises receive a set of channel estimations from a second communication device, wherein channel estimation corresponds to a radiating pattern in the set of radiating patterns, compute the set of weights based on a channel estimation in the set of channel estimations and the first symbol constellation.

An advantage with this implementation form is that feedback overhead from a second communication device to obtain the weights is reduced.

In an implementation form of a first communication device according to at least one embodiment, obtain the set of weights comprises receive a set of reference signals associated with the set of radiating patterns from a second communication device, determine a set of channel estimations based on the received set of reference signals, wherein channel estimation corresponds to a radiating pattern in the set of radiating patterns, compute the set of weights based on a channel estimation in the set of channel estimations; or receive the weights from a second communication device.

An advantage with this implementation form is that feedback overhead from a second communication device to obtain the weights is reduced.

In an implementation form of a first communication device according to at least one embodiment, obtain the second symbol constellation comprises map the first symbol constellation onto the set of weights to obtain the second symbol constellation.

The mapping in cases is linear mapping.

An advantage with this implementation form is that the enhanced properties of the second symbol constellation to enable higher rate or higher reliability transmission are achieved by a low complexity implementation via linear mapping.

In an implementation form of a first communication device according to at least one embodiment, obtain the second symbol constellation comprises after mapping the first symbol constellation onto the set of weights perform power control and phase shift to obtain the second symbol constellation.

An advantage with this implementation form is that the second symbol constellation is formed by the help of the phase shifters which can enable lower complexity and cheaper analog domain or hybrid digital-analog implementations.

In an implementation form of a first communication device according to at least one embodiment, the second symbol constellation is any of M-PSK or M-QAM.

M is a positive integer.

An advantage with this implementation form is that it, using the weights, enables backwards compatibility with existing communication systems using above modulation schemes such that the effective constellation received by the receiver is one of the legacy constellations.

According to at least one embodiment, the above mentioned and other objectives are achieved with a second communication device configured to receive a set of reference signals from a first communication device, wherein the set of reference signals is associated with a set of radiating patterns of a set of antenna elements;

determine a set of channel estimations based on the received set of reference signals, wherein channel estimation corresponds to a radiating pattern in the set of radiating patterns;

compute a first symbol constellation based on a channel estimation in the set of channel estimations.

An advantage of the second communication device according to at least one embodiment is that the second symbol constellation is customized to the radio environment to enable smart radio that enjoys improved signal design and thereby better performance.

In an implementation form of a second communication device according to at least one embodiment, configured to transmit the first symbol constellation to the first communication device.

In an implementation form of a second communication device according to at least one embodiment, configured to compute a set of weights based on a channel estimation in the set of channel estimations and the first symbol constellation; and transmit the set of weights to the first communication device.

According to at least one embodiment, the above mentioned and other objectives are achieved with a method for a first communication device comprising a set of antenna elements configured to operate in a set of radiating patterns; the method comprising obtaining a first symbol constellation based on a radiating pattern in the set of radiating patterns, obtaining a set of weights associated with the first symbol constellation, obtaining a second symbol constellation based on the first symbol constellation and the set of weights, and controlling the set of antenna elements according to the radiating pattern for transmitting a set of information bits mapped onto the second symbol constellation.

The method according to at least one embodiment is extended into implementation forms corresponding to the other implementation forms of the first communication device. Hence, an implementation form of the method comprises the feature(s) of the corresponding implementation form of the first communication device.

The advantages of the methods according to at least one embodiment are the same as those for the corresponding implementation forms of the first communication device according to at least one embodiment.

According to at least one embodiment, the above mentioned and other objectives are achieved with a method for a second communication device, the method comprises receiving a set of reference signals from a first communication device, wherein the set of reference signals is associated with a set of radiating patterns of a set of antenna elements;
determining a set of channel estimations based on the received set of reference signals, wherein channel estimation corresponds to a radiating pattern in the set of radiating patterns;
computing a first symbol constellation based on a channel estimation in the set of channel estimations.

The method according to at least one embodiment is extended into implementation forms corresponding to the implementation forms of the second communication device. Hence, an implementation form of the method comprises the feature(s) of the corresponding implementation form of the second communication device.

The advantages of the methods according to at least one embodiment are the same as those for the corresponding implementation forms of the second communication device.

According to at least one embodiment, this application provides a chip, and the chip is used for a first communication device and/or a second communication device. The chip includes at least one communications interface, at least one processor, and at least one memory, where the communications interface, the processor, and the memory are interconnected by using a circuit (or by using a bus in some cases), and the processor invokes an instruction stored in the memory to perform the method according to the third or fourth aspect.

According to at least one embodiment, this application provides a first communication device and/or a second communication device which includes a memory and a processor. The memory is configured to store a program instruction, and the processor is configured to invoke the program instruction in the memory, to implement a function of the first communication device and/or a second communication device.

According to at least one embodiment, this application provides a non-volatile storage medium, and the non-volatile storage medium stores one or more pieces of program code. In response to a first communication device and/or a second communication device executing the program code, the first communication device and/or a second communication device performs a related method step performed by the first communication device and/or a second communication device.

At least one embodiment relates to a computer program, characterized in program code, which in response to being run by at least one processor causes said at least one processor to execute any method. Further, at least one embodiment relates to a computer program product comprising a computer readable medium and said mentioned computer program, wherein said computer program is included in the computer readable medium, and comprises of one or more from the group: ROM (Read-Only Memory), PROM (Programmable ROM), EPROM (Erasable PROM), Flash memory, EEPROM (Electrically EPROM) and hard disk drive.

Further applications and advantages of at least one embodiment will be apparent from the following detailed description.

BRIEF DESCRIPTION OF THE DRAWINGS

The appended drawings are intended to clarify and explain different embodiments described herein:

FIG. 1 shows a block diagram of a first communication device according to at least one embodiment;

FIG. 2a illustrates different radiating patterns and FIG. 2b illustrates two different arrangements of antenna elements in relation to an emitting element according to at least one embodiment;

DETAILED DESCRIPTION

Figure 3:
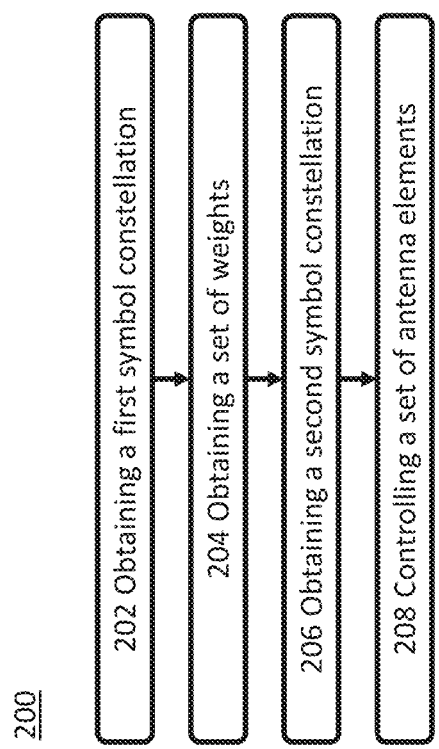
FIG. 3 shows a method for a first communication device according to at least one embodiment.

The symbol constellations of MBM for a transmit antenna and a receive antenna as previously described have a small minimum pairwise distance. The main reason is that the constellation symbols are formed randomly which follow the channel distribution law that is given by the medium. Thus, the minimum pairwise distance of the received symbol constellation for MBM varies by the media and is very small. This is the reason for the fact that the performance of a single input single output (SISO) MBM, i.e., a transmit antenna surrounded by RF mirrors with an antenna receiver, is worse than that of SISO source-based modulation, i.e., a SISO channel with quadrature amplitude modulation (QAM). This makes MBM not an attractive candidate for SISO channels.

In at least one embodiment, signal processing enhances the spectral efficiency of wireless communication systems.

FIG. 1 shows a first communication device 100 configured for communicating in communication systems according to at least one embodiment. The first communication device 100 comprises a set of antenna elements 106a, 106b, . . . , 106n configured to operate in a set of radiating patterns 600a, 600b, . . . , 600n. The first communication device 100 further comprises a processor 108 configured to control the set of antenna elements 106a, 106b, . . . , 106n via the dashed control line. A control signal might be formed at the processor 108 and sent to the antenna elements 106a, 106b, . . . , 106n via the wired control line. to adjust the states of the set of antenna elements 106a, 106b, . . . , 106n. Also a wireless solution is possible (not shown in the FIGS.) in which instead a wireless control signal is sent from the processor 108 to the set of antenna elements 106a, 106b, . . . , 106n for controlling the states. The wired or wireless control signal in at least one embodiment depend on the information bits such that the information bits are mapped to the set of radiating patterns 600a, 600b, . . . , 600n. Hence, based on the incoming information bits the control signal is modified to configure a given radiation pattern.

A radiating pattern of the set of antenna elements 106a, 106b, . . . , 106n is understood as directional dependence of the strength of the radio waves from the antenna elements. The strength of the radiating pattern is measured in different angles such as in azimuth and the elevation angles. In addition to the direction, the radiation pattern can either be measured close to the antenna elements (e.g., in the near field) or close to the receiver (e.g., in the far field). It is noted that an activation pattern of the set of antenna elements 106a, 106b, . . . , 106n results in a radiation pattern. Therefore, the term radiating pattern is sometimes denoted as the activation pattern in the following disclosure. The radiation patterns are also understood as transmission beams or radio beams.

Moreover, an emitting element 104 is connected to an RF chain block 124 which is a cascade of electronic components used to generate and transmit the RF signal. The RF chain block 124 provides a RF signal to the emitting element 104 which is configured to emit a radio wave at a given frequency of the RF signal but is not limited thereto. Hence, the first communication device 100 could also use multiple frequencies or any multiple-carrier scheme. The emitting element 104 is surrounded by the set of antenna elements 106a, 106b, . . . , 106n in different configurations or designs depending on application. The emitted RF signal from the emitting element 104 propagates towards the set antenna elements 106a, 106b, . . . , 106n. In FIG. 1 the emitting element 104 is surrounded by 16 antenna elements which are arranged cylindrically around the emitting element 104 only to exemplify a design. However, other arrangements of antenna elements in terms of number of antenna elements, types of antenna elements, and how the antenna elements are ordered, selected and located, is envisaged.

Furthermore, the first communication device 100 also includes a bit feeder block 120 configured to feed information bits for transmission to a second communication device 300. The information bits are fed by the bit feeder block 120 to a serial-to-parallel block 122 which is configured to convert the information bits from serial to parallel to change the radiating pattern. After serial-to-parallel conversion the information bits are provided from the serial-to-parallel block 122 to a weight processing block 132 which is controlled by the processor 108 via the dashed control line from the processor 108 to the weight processing block 132.

Mentioned processor 108 of the first communication device 100 is referred to as one or more general-purpose central processing units (CPUs), one or more digital signal processors (DSPs), one or more application-specific integrated circuits (ASICs), one or more field programmable gate arrays (FPGAs), one or more programmable logic devices, one or more discrete gates, one or more transistor logic devices, one or more discrete hardware components, and one or more chipsets but is not limited thereto. Further, the processor 108 is configured to control one or more of the other functional blocks of the first communication device 100.

According to at least one embodiment, the processor 108 is configured to obtain a first symbol constellation based on a radiating pattern 600i (where i denotes an index numeral) in the set of activation patterns 600a, 600b, . . . , 600n. Activation pattern results in a corresponding radiation pattern. The processor 108 is further configured to obtain a set of weights associated with the first symbol constellation. The processor 108 is further configured to obtain a second symbol constellation based on the first symbol constellation and the set of weights associated with the first symbol constellation. The processor 108 is further configured to control the set of antenna elements 106a, 106b, . . . , 106n according to the radiating pattern 600i for transmitting a set of information bits mapped onto the second symbol constellation.

In embodiments, antenna element 106n in the set of antenna elements 106a, 106b, . . . , 106n is configured to operate in multiple radiating states so that the set of antenna elements 106a, 106b, . . . , 106n operates in the set of radiating patterns 600a, 600b, . . . , 600n. Multiple radiating states means two or more radiating states. Different solutions is used to achieve different radiating states. For example, varactors are used to control the antenna elements 106a, 106b, . . . , 106n in this respect. Further, load, polarization and impedance of the antenna elements are controlled so as to control the radiating states. Also, changing the spatial location of the antenna elements 106a, 106b, . . . , 106n changes the radiating states. This last example actually changes the physical location of the antenna elements but could still produce different radiation patterns observed from a second communication device 300 configured to receive RF signals from the first communication device 100. Producing different radiation patters are also understood as a variation of space shift keying (SSK). The antenna elements 106a, 106b, . . . , 106n also compromise the so called meta-surfaces (or any intelligent surfaces) to enable meta-surface based modulations.

FIG. 2a illustrates different configurations or activation patterns for the set of antenna elements 106a, 106b, . . . , 106n arranged in a rectangular shape around the emitting element 104. The set of antenna elements 106a, 106b, . . . , 106n have multiple radiating states. In this exemplary illustration three radiating states for antenna element 106a, 106b, . . . , 106n are shown. The radiating states are created, for example, by changing the load of the antenna elements by using two switches (such as diodes) for an antenna element. By changing the load obtained: a) an open radiating state (i.e., both switches are open), b) a closed radiating state (i.e., both switches are closed), and c) a semi-open or semi-closed radiating state (i.e., only one of the switches are either open or closed). A black dot illustrates an antenna element in the closed radiating state, a white dot illustrates an antenna element in the open radiating state, and a dot with vertical lines illustrates an antenna element in the semi-open or the semi-closed radiating state. By choosing different radiating states for the antenna elements 106a, 106b, . . . , 106n different radiation patterns are obtained. For example, configuration or activation patterns 600a in FIG. 2a results in a first radiating pattern for the first communication device 100, activation pattern 600b in FIG. 2a results in a second radiating pattern, and activation pattern 600i in FIG. 2a results in a third radiating pattern, etc.

In embodiments, the set of antenna elements 106a, 106b, . . . , 106n is arranged within a range of the emitting element 104. The range is such that the set of antenna elements will impact the propagation of the RF signal emitted by the emitting element 104. The range is the state of the antenna elements as an additional dimension for the design. The set of antenna elements are placed. for example, in the near field (including the reactive or radiative near field) or the far field of the emitting element 104. The location of the set of antenna elements 106a, 106b, . . . , 106n in relation to the emitting element 104 impacts the propagation model of the emitted wave and hence by using the set of weights the second symbol constellation is constructed in a favorable manner in respect of performance.

FIG. 2b therefore illustrates two different designs of the set of antenna elements 106a, 106b, . . . , 106n arranged within a range of the emitting element 104. The set of antenna elements 106a, 106b, . . . , 106n are arranged around the emitting element 104 in the same shape as in FIG. 2a. However, in example A in FIG. 2b the antenna elements are arranged with a distance d1 from the emitting element 104 while in example B in FIG. 2b the antenna elements are arranged with a distance d2 from the emitting element 104 where d2»d1 which means that the radiating pattern will be different for examples A and B due to the difference in distance from the emitting element 104. That is, in addition to the previous examples of radiating states, i.e., open, closed, or semi-open/semi-closed by adjusting the switches, additional radiation patterns are able to be obtained by varying the location of the set of antennas elements 106a, 106b, . . . , 106n. The variation of location of the set of antenna elements is done in the near field case or/and in the far field case in relation to the emitting element 104. The set of antenna elements 106a, 106b, . . . , 106n is also grouped such that the antenna elements in a group has almost the same distance from the emitting element 104 but the groups have different distance to the emitting element 104. The arrangement of the set of antenna elements is done in any 3D shape with irregular as well as regular inner-distance among the set of antenna elements 106a, 106b, . . . , 106n.

In a non-shown implementation, the set of antenna elements 106a, 106b, . . . , 106n is mounted right below external shield of the emitting element 104, for example below the shield of a base station. In such example, the antenna elements 106a, 106b, . . . , 106n are arranged almost on a regular two-dimensional grid. The size, shape and the geometrical arrangement of the antenna elements 106a, 106b, . . . , 106n as well as the corresponding radiating state for an antenna element are altered or adapted and optimized for a certain communication scenario such that it results to a more favorable channel conditions.

In embodiments, the set of antenna elements 106a, 106b, . . . , 106n are controlled by positive intrinsic negative (PIN) diodes also known as RF switches previously mentioned. In an antenna element, in response to PIN diodes being turned on or off simultaneously, an antenna element will then have two radiating states, i.e. a first radiating state in which the antenna element is transparent to the incident wave in response to the PIN diode of the antennal element being open and a second radiating state in which the antenna element will reflect the incident wave in response to the diode of the antenna element is closed.

The set of antenna elements 106a, 106b, . . . , 106n is in embodiments a set of RF mirrors, which is understood as apparatuses that enable perturbation to the radio channel. These perturbation are controlled such that they convey information from the transmitter to the receiver. For example, the RF mirrors could be constructed by mentioned PIN diodes and patch antennas such that the perturbation are controlled by the help of the PIN diodes. The antenna elements form intelligent reflecting surfaces (IRS), large intelligent surfaces (LIS), reconfigurable intelligent surfaces (RIS), passive/active relaying arrays (PRA), and meta-surfaces (MS). Therefore, at least one embodiment is able to be used for such set up as well. For such cases, the set of antenna elements 106a, 106b, . . . , 106n are placed on IRS, LIS, RIS, PRA and MS, which could be located between the transmitter and the receiver. The antenna elements 106a, 106b, . . . , 106n could be collocated or distributed.

The set of radiating patterns of the set of antenna elements are denoted by $\{\pi_i\}_{i=1}^{2^m}$. where m is number of total PIN diodes that is switched on and off independently and $\pi_i$ is a binary sequences of length m where 1 represents that the diode is switched on and 0 refers the case where the diode of a given mirror is switched off. In at least one embodiment, multiple states larger than two, are used represent the state of the antenna elements with a larger alphabet size. Since m is number of total PIN diodes that are switched on and off independently, the total number of radiating patterns is equal to $2^m$. It is noted that the binary string $\pi_i$ might be shorter than the maximum possible length that entire radiating patterns offer for example by not using the antenna elements for practical reason or by using them in correlated manner with other antenna elements, i.e., a subset of antenna elements whose diodes turn on and off at the same time. In response to assuming that an antenna element has a diode that switch on and off independently, then m≤M where M is the total number of antenna elements. The set of radiating patterns $\{\pi_i\}_{i=1}^{2^m}$ enable transmission of m bits.

In embodiments the first communication device 100 receives feedback from the second communication device 300. The first communication device 100 uses the feedback to compute weights $\{w_i\}_{i=1}^{2^m}$ subject to e.g., a power constraint. The weights might have been computed at the second communication device 300 and sent back to first communication device 100. Another alternative is that the first communication device 100 computes the weights using control signals that the second communication device 300 sends to the first communication device 100. Let's denote the signal point for a radiation pattern as $\{s_i\}_{i=1}^{2^m}$ where $s_i$ corresponds to $\pi_i$ for i=1, 2, . . . , $2^m$ with unitary set of weights such that the weights produces the same symbol constellation $\{s_i\}_{i=1}^{2^m}$ at the first communication device 100. The second communication device 300 computes these signal points using reference signals associated to a radiation pattern, that are transmitted to the second communication device 300. In one embodiment, the second communication device used the knowledge of $\{s_i\}_{i=1}^{2^m}$ to compute weights $\{w_i\}_{i=1}^{2^m}$ subject to a power constraint. The weights $\{w_i\}_{i=1}^{2^m}$ will result in a new symbol constellation $\{w_i s_i\}_{i=1}^{2^m}$. The incoming combination of information bits are mapped to a corresponding radiation pattern with its associated weight. The information bits are passed to the processor 108 of the first communication device 100 where based on the combination of the information bits generates a control signal that activates a radiating pattern in the set of radiating patterns of the set of antenna elements that corresponds to a given subset of information bits. Further aspects of the interaction between the first communication device 100 and the second communication device 300 is given in the following disclosure.

FIG. 3 shows a flow chart of a corresponding method 200 which is executed in a first communication device 100, such as the one shown in FIG. 1. Hence, the first communication device 100 comprises a set of antenna elements 106a, 106b, . . . , 106n configured to operate in a set of radiating patterns 600a, 600b, . . . , 600n, and a processor 108 configured to control the set of antenna elements 106a, 106b, . . . , 106n. The method 200 which is executed by the processor 108 comprises obtaining 202 a first symbol constellation based on a radiating pattern 600i in the set of radiating patterns 600a, 600b, . . . , 600n. The method 200 further comprises obtaining 204 a set of weights associated with the first symbol constellation. The method 200 further comprises obtaining 206 a second symbol constellation based on the first symbol constellation and the set of weights. The method 200 further comprises controlling 208 the set of antenna elements 106a, 106b, . . . , 106n according to the radiating pattern 600i for transmitting a set of information bits mapped onto the second symbol constellation.

Figure 4:
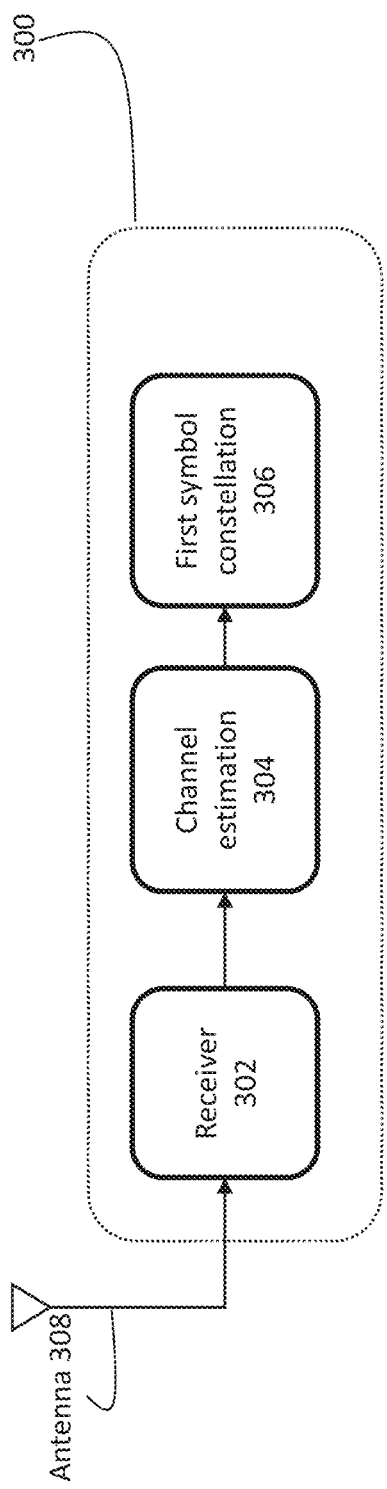
FIG. 4 shows a second communication device according to at least one embodiment.

FIG. 4 shows a second communication device 300 according to at least one embodiment. The second communication device 300 is also denoted as a receiver. In the embodiment shown in FIG. 4, the second communication device 300 comprises a receiver block 302, a channel estimation block 304 and a first symbol constellation block 306 coupled with communication means known in the art. Further, the receiver block 302 is coupled to an antenna or an antenna array 308.

The processor 302 of the second communication device 300 is referred to as one or more general-purpose central processing units (CPUs), one or more digital signal processors (DSPs), one or more application-specific integrated circuits (ASICs), one or more field programmable gate arrays (FPGAs), one or more programmable logic devices, one or more discrete gates, one or more transistor logic devices, one or more discrete hardware components, and one or more chipsets. The memory 306 of the second communication device 300 is a read-only memory, a random access memory, or a non-volatile random access memory (NVRAM). The transceiver 304 of the second communication device 300 is a transceiver circuit, a power controller, an antenna, or an interface which communicates with other modules or devices. In embodiments, the transceiver 304 of the second communication device 300 is a separate chipset or being integrated with the processor 302 in one chipset. While in some embodiments, the processor 302, the transceiver 304, and the memory 306 of the second communication device 300 are integrated in one chipset.

According to embodiments, the receiver block 302 is configured to receive a set of reference signals from a first communication device 100 via the antenna 308. The set of reference signals is associated with a set of radiating patterns 600a, 600b, . . . , 600n of a set of antenna elements 106a, 106b, . . . , 106n of the first communication device 100. The channel estimation block 304 is configured to determine a set of channel estimations based on the received set of reference signals. A channel estimation corresponds to a radiating pattern 600i in the set of radiating patterns 600a, 600b, . . . , 600n of the first communication device 100. The first symbol constellation block 306 is configured to compute a first symbol constellation based on a channel estimation in the set of channel estimations.

In embodiments, one or more operations performed by the receiver block 302, the channel estimation block 304 and the first symbol constellation block 306 are executed by a processor 302 of the second communication device 300 which is referred to as one or more general-purpose central processing units (CPUs), one or more digital signal processors (DSPs), one or more application-specific integrated circuits (ASICs), one or more field programmable gate arrays (FPGAs), one or more programmable logic devices, one or more discrete gates, one or more transistor logic devices, one or more discrete hardware components, and one or more chipsets. The processor cooperates with a memory of the second communication device 300 which is a read-only memory, a random access memory, a non-volatile random access memory (NVRAM) or any other suitable memory.

Figure 5:
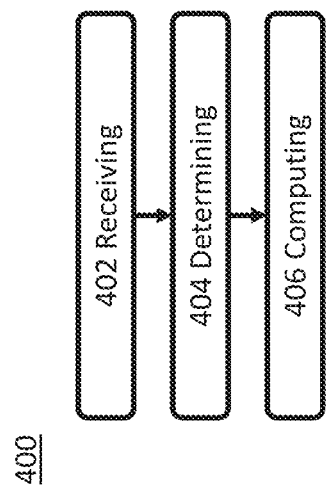
FIG. 5 shows a method for a second communication device according to at least one embodiment.

FIG. 5 shows a flow chart of a corresponding method 300 which is executed in a second communication device 300, such as the one shown in FIG. 4. The method 400 comprises receiving 402 a set of reference signals from a first communication device 100. The set of reference signals is associated with a set of radiating patterns 600a, 600b, . . . , 600n of a set of antenna elements 106a, 106b, . . . , 106n of the first communication device 100. The method 400 comprises determining 404 a set of channel estimations based on the received set of reference signals. A channel estimation corresponds to a radiating pattern 600i in the set of radiating patterns 600a, 600b, . . . , 600n of the first communication device 100. The method 400 further comprises computing 406 a first symbol constellation based on a channel estimation in the set of channel estimations.

Figure 6:
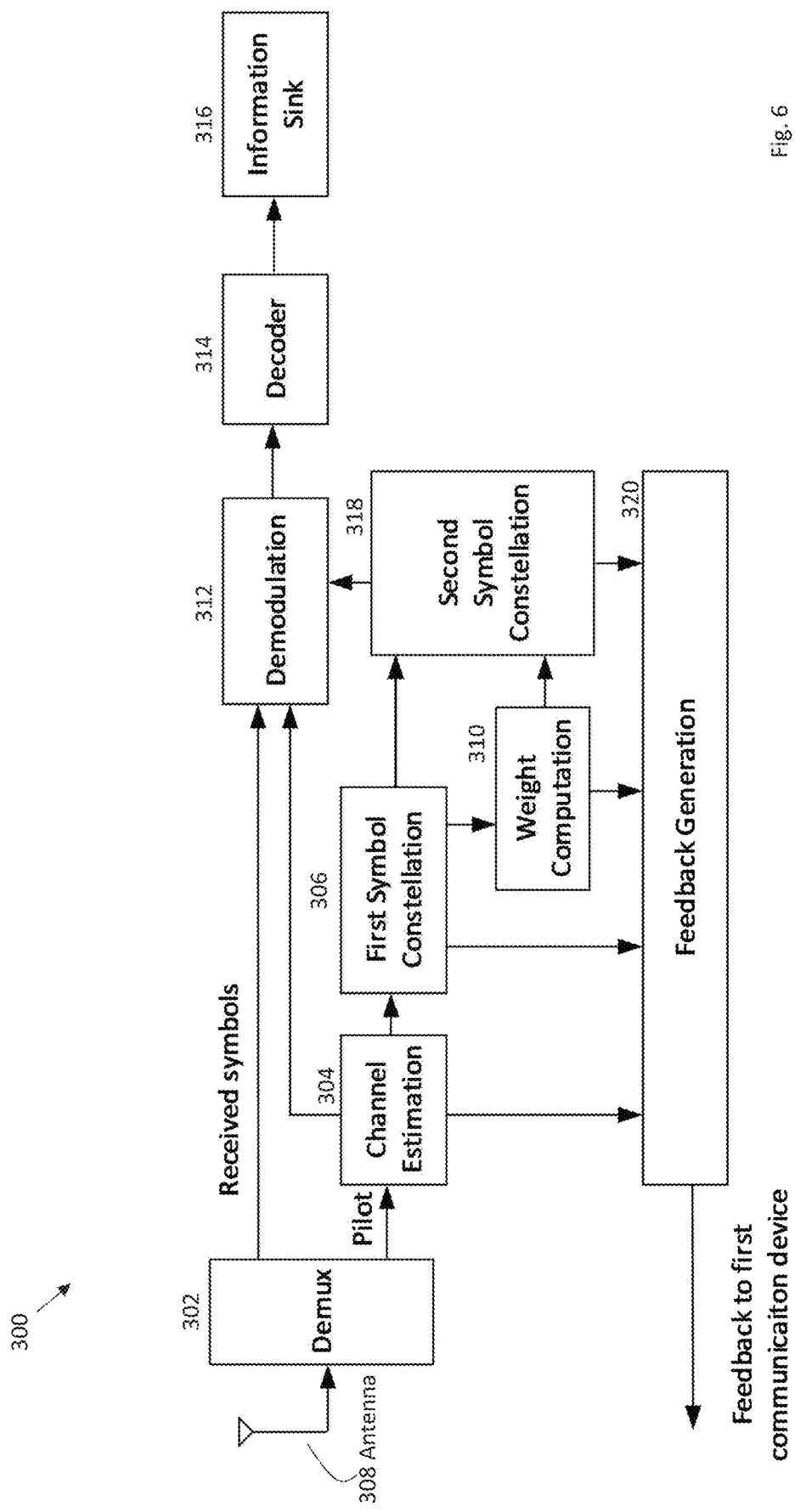
FIG. 6 shows a second communication device according to at least one embodiment.

FIG. 6 shows a further embodiment of the second communication device 300. In response to pilots being transmitted from the first communication device 100 to the second communication device 300 (e.g., in the DL), the second communication device 300 receives the pilots at the antenna or antenna array 308. The received pilots are de-multiplexed in the receiver block 302, i.e., de-mapping of the resources in time, frequency or code domain. The de-multiplexed pilots are provided to the channel estimation block 304 which based on the received pilots estimates the channel for a radiating pattern associated to a pilot. The channel estimates are then provided to the first symbol constellation block 306 which forms the first symbol constellation based on the channel estimates. Based on the first symbol constellation the weights are computed in the weight computation block 310 for a given design metric. Further, based on the weights and the first symbol constellation the second symbol constellation is formed in the second symbol constellation block 318, e.g., by using a linear mapping. Using the second symbol constellation with the known symbols and their associated bit-to-symbol mapping (i.e., which information bits are carried by different symbols) demodulation is performed on the received symbols in the demodulation block 312. The demodulation block 312 computes Log Likelihood Ratio (LLR) values for different symbols or bits as an input to the decoder block 314. To compute LLR values, the demodulation block 312 also uses as input channel estimations from the channel estimation block 304. Thereafter, the demodulated symbols are decoded in the decoding block 314. The information sink block 316 receives the decoded symbols from the decoder block 314 for an application. Further, a feedback signal is formed in the feedback generator 320 based on any combination of the channel estimation from the channel estimation block 304, the first symbol constellation from the first symbol constellation block 306, the weights from the weight computation block 310 and the second symbol constellation from the second symbol constellation block 318, or any indication of these parameters which could include compression, variations of the parameters or an index based on a predefined table. The feedback signal is transmitted to the first communication device 100.

In at least one embodiment in response to pilots instead being transmitted in the reverse direction from the second communication device 300 to the first communication device 100 (e.g. in the UL), the weights and the second symbol constellation may be computed at the first communication device 100 using the same methods as used in the second communication device 300. Thereby, feedback signalling from the second communication device 300 might be eliminated or reduced. In certain cases, the first communication device 100 informs the second communication device 300 about the second symbol constellation using a control channel.

In at least one embodiment, in response to a legacy symbol constellation being formed, which is implemented by selecting the proper weights, the demodulator block 312 and the decoder block 314 do not need to be informed about the second symbol constellation as the weights are computed to generate a symbol constellation which has the same constellation points as the legacy symbol constellations.

Figure 7:
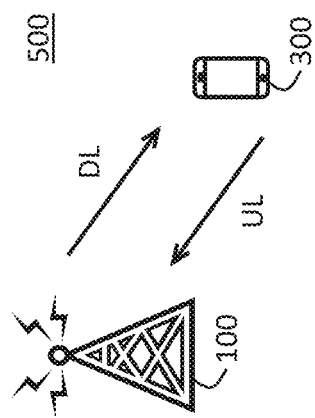
FIG. 7 shows a wireless communication system according to at least one embodiment.

FIG. 7 shows a wireless communication system 500 according to at least one embodiment. The wireless communication system in this disclosure includes but is not limited to LTE, 5G or any future wireless communication system. The wireless communication system 500 comprises a first communication device 100 and a second communication device 300 configured to communicate in the wireless communication system 500. For simplicity, the wireless communication system 500 shown in FIG. 7 only comprises first communication device 100 and a second communication device 300. However, the wireless communication system 500 includes any number of first communication devices and any number of second communication devices without deviating from the scope of embodiments described herein.

In the wireless communication system 500 illustrated in FIG. 7 the first communication device 100 act as or is comprised in a network access node, such as a gNB, whilst the second communication device 300 act as or is comprised in a client device, such as a UE. The reverse case is possible, i.e., the first communication device 100 act as a client device whilst the second communication device 300 act as a network access node. In the exemplary scenario the first communication device 100 and the second communication device 300 communicate in the downlink (DL) and/or the uplink (UL) e.g., via Uu interface.

A client device in this disclosure includes but is not limited to: a UE such as a smart phone, a cellular phone, a cordless phone, a session initiation protocol (SIP) phone, a wireless local loop (WLL) station, a personal digital assistant (PDA), a handheld device having a wireless communication function, a computing device or another processing device connected to a wireless modem, an in-vehicle device, a wearable device, an integrated access and backhaul node (IAB) such as mobile car or equipment installed in a car, a drone, a device-to-device (D2D) device, a wireless camera, a mobile station, an access terminal, an user unit, a wireless communication device, a station of wireless local access network (WLAN), a wireless enabled tablet computer, a laptop-embedded equipment, an universal serial bus (USB) dongle, a wireless customer-premises equipment (CPE), and/or a chipset. In an Internet of things (IOT) scenario, the client device represents a machine or another device or chipset which performs communication with another wireless device and/or a network equipment.

The UE is further referred to as a mobile telephone, a cellular telephone, a computer tablet or laptop with wireless capability. The UE in this context is, for example, a portable, pocket-storable, hand-held, computer-comprised, or vehicle-mounted mobile device, enabled to communicate voice and/or data, via the radio access network, with another entity, such as another receiver or a server. The UE is a station (STA), which is any device that contains an IEEE 802.11-conformant media access control (MAC) and physical layer (PHY) interface to the wireless medium (WM). The UE is also configured for communication in 3GPP related LTE and LTE-Advanced, in WiMAX and its evolution, and in fifth generation wireless technologies, such as NR.

A network access node in this disclosure includes but is not limited to: a NodeB in wideband code division multiple access (WCDMA) system, an evolutional Node B (eNB) or an evolved NodeB (eNodeB) in LTE systems, or a relay node or an access point, or an in-vehicle device, a wearable device, or a gNB in the fifth generation (5G) networks.

Further, the network access node herein is denoted as a radio network access node, an access network access node, an access point, or a base station, e.g., a radio base station (RBS), which in some networks is referred to as transmitter, "gNB", "gNodeB", "eNB", "eNodeB", "NodeB" or "B node", depending on the technology and terminology used. The radio network access nodes are of different classes such as e.g., macro eNodeB, home eNodeB or pico base station, based on transmission power and thereby also cell size. The radio network access node is a station (STA), which is any device that contains an IEEE 802.11-conformant MAC and PHY interface to the wireless medium. The radio network access node is also a base station corresponding to the 5G wireless systems.

Figure 8:
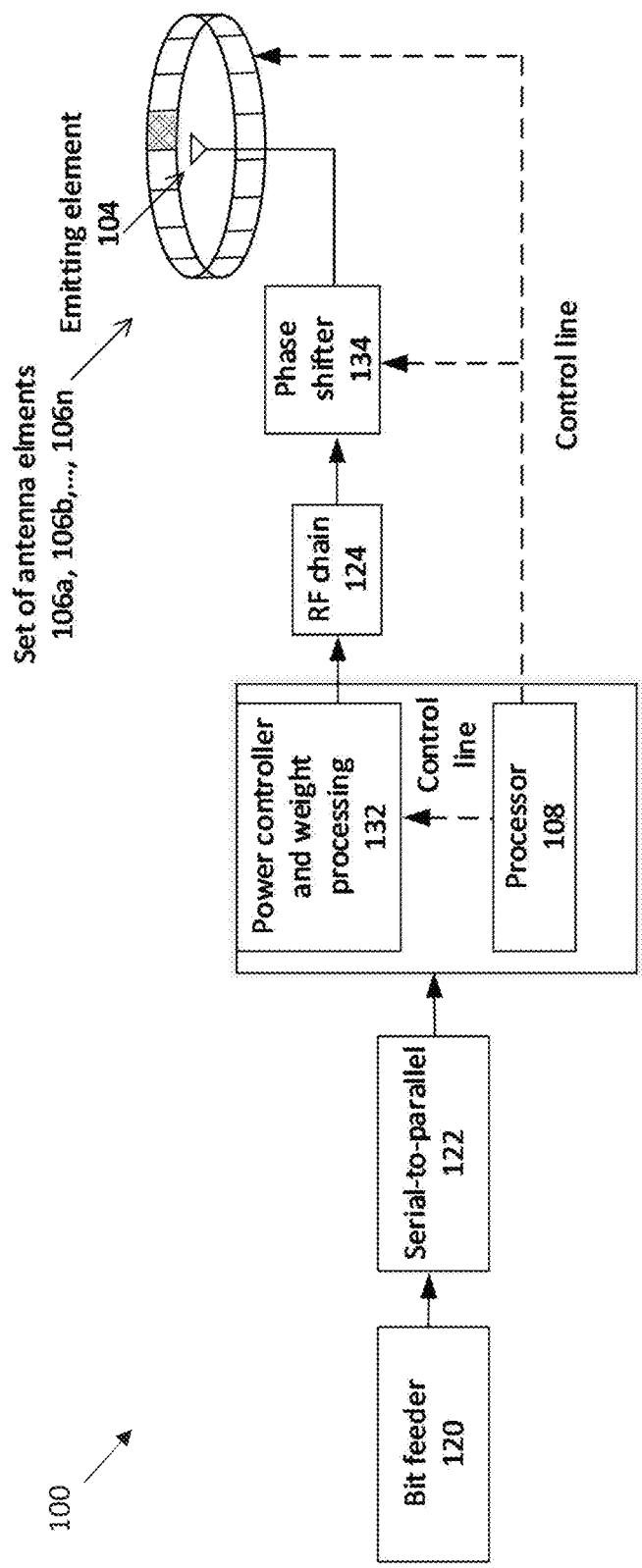
FIG. 8 illustrates a first communication device employing power control and phase shifting according to at least one embodiment.

In embodiments, power control and phase shifting are also employed which is illustrated in the block diagram in FIG. 8. Hence, obtaining the second symbol constellation comprises, after mapping the first symbol constellation onto the set of weights, to perform power control and phase shift to obtain the second symbol constellation. Thereby, symbol constellation shaping of the first symbol constellation is implemented by two separate blocks, i.e., a power controller and weight processing block 132 and a phase-shifter block 134. The blocks are configured and controlled by the processor 108 via the dashed control lines extending from the processor 108. The power controller and weight processing block 132 enables to change the distance of the symbol point from the origin in the two dimensional plane and the phase-shifter block 134 (or equivalently a time-delay block) enables the rotation of symbols in the two dimensional plane. The combination of these two operations allow to form a favorable second symbol constellation. The phase-shifter block 134 (or equivalently the time-delay block) is implemented in the analogue domain or jointly with the antenna elements or as a part of the antenna elements. The power controller and weight processing block 132 and the phase-shifter block 134 is configured for the radiating patterns of the first communication device 100. The power controller or the phase-shifter uses quantized steps for the configuration. For example, the power controller or the phase-shifter is configured according to a formula where the step-size for the power and/or phase adjustment varies according to the symbol constellations or the channel variations.

Figure 9:
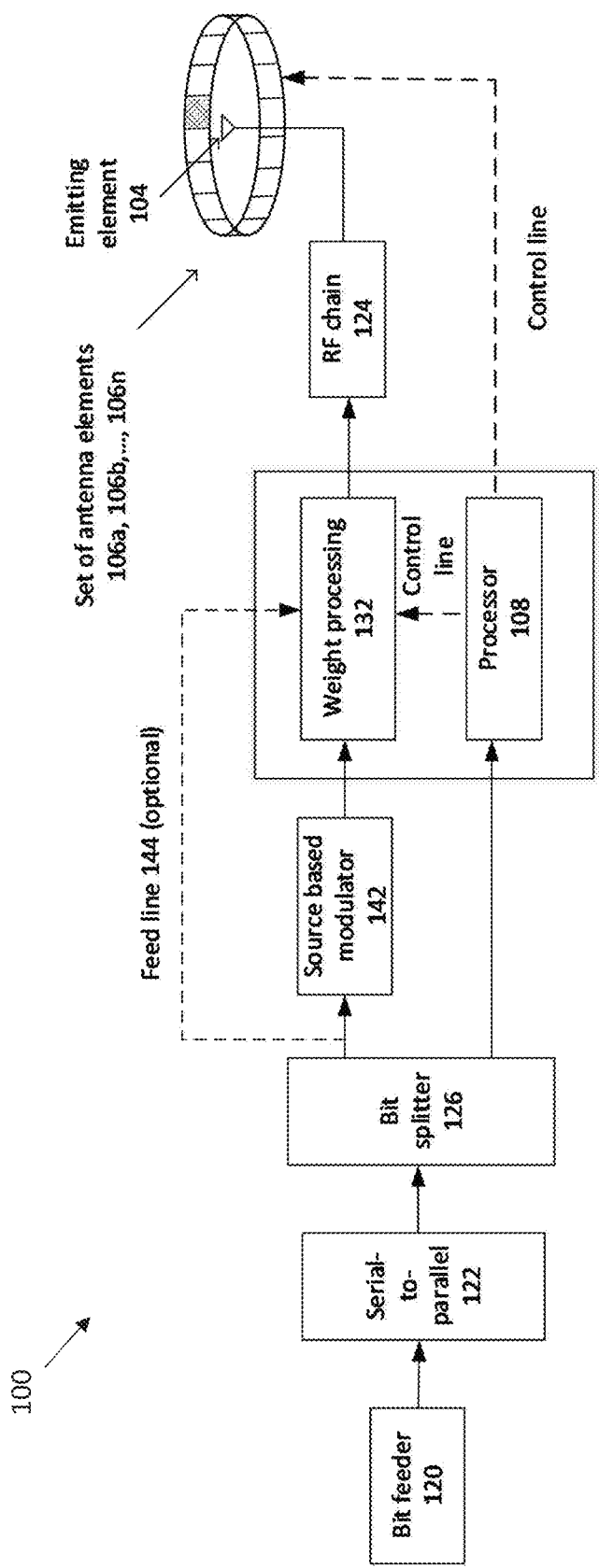
FIG. 9 illustrates a first communication device employing source based modulation according to at least one embodiment.

In embodiments, source-based modulation is also used for computing the first symbol constellation which is illustrated in the block diagram in FIG. 9. Hence, computing the first symbol constellation comprises compute the first symbol constellation based on a channel estimation in the set of channel estimations and source based modulation. Source-based modulation is understood as the modulation schemes that change the digital signal based on the information bits prior passing through the RF chain 124. Examples include M-ary Phase Shift Keying (e.g., BPSK and QPSK) and M-ary Quadrature Amplitude Modulation M-QAM (e.g., 16QAM and 64QAM).

The first communication device 100 comprises a bit splitter block 126 arranged after the serial-parallel block 122 in FIG. 9. Assume that a symbol point of the source-based modulation is $m_1$ bits per signal points. That is, for QPSK and 16QAM $m_1$ is equal to 2 and 4, respectively. Then the set of radiating patterns $\{\pi_i\}_{i=1}^{2^{m_2}}$ enable transmission of $m_2$ bits per channel use. The information bits are grouped into $m_1+m_2$ bits by the serial-parallel block 122. The grouped bits are thereafter split into $m_1$ and $m_2$ bits in the bit splitter block 126, where the $m_1$ bits determines a symbol point of the source-based modulation and the $m_2$ bits corresponds to one radiating pattern in the set of radiating patterns. The set of weights allows to shape the symbols. The set of weights is used to change incoming combination of bits $2^{m_1+m_2}$. Thus, the number of weights for the first and the second implementations are $2^{m_2}$ and $2^{m_1+m_2}$, respectively. Thereby, the effective symbol constellation generated by the source-based and the radiation patterns are enlarged such that the effective symbol constellation carries $m_1+m_2$ per symbol and the spectral efficiency and hence the link throughput is improved.

The first communication device 100 in FIG. 9 also includes an optional feed line 144. In response to the first communication device 100 including the feed line 144, the first communication device enables a choice of the symbol obtained by the source-based modulation to also change the weights in addition to the radiation patterns obtained by choosing an activation pattern for the set of antenna elements 106a, 106b, . . . , 106n. An advantage of this implementation is that the resultant hybrid second symbol constellation obtained by source-based modulation and the antenna elements (i.e., different radiation patterns) are jointly optimized. This in turn enables a second symbol constellation with improved performance.

If the first communication device 100 does not include the feed line 144 (not shown in FIG. 9), it reduces the number of weights for optimization which could be only dependent on the antenna elements and hence reduces the complexity of the optimization of the second symbol constellation but has lower performance compared to the solution with feed line 144.

The bit splitter block 126 also arranges the information bits into two information sequences of bits, which could be a set of binary bits. The two information sequences of bits could be joint or disjoint set of information. The first information sequence of bits is fed to the source-based modulator 142 and the second information sequence of bits is fed directly to the processor 108 which upon its reception adapts the weights as well as the antenna elements 106a based on the second information sequence of bits.

Examples of source-based modulation include but is not limited to source modulation such as phase-shift keying (PSK), e.g., binary PSK (BPSK) and quadrature PSK (QPSK), and quadrature amplitude modulation (QAM) such as 16QAM and 64QAM.

Figure 10:
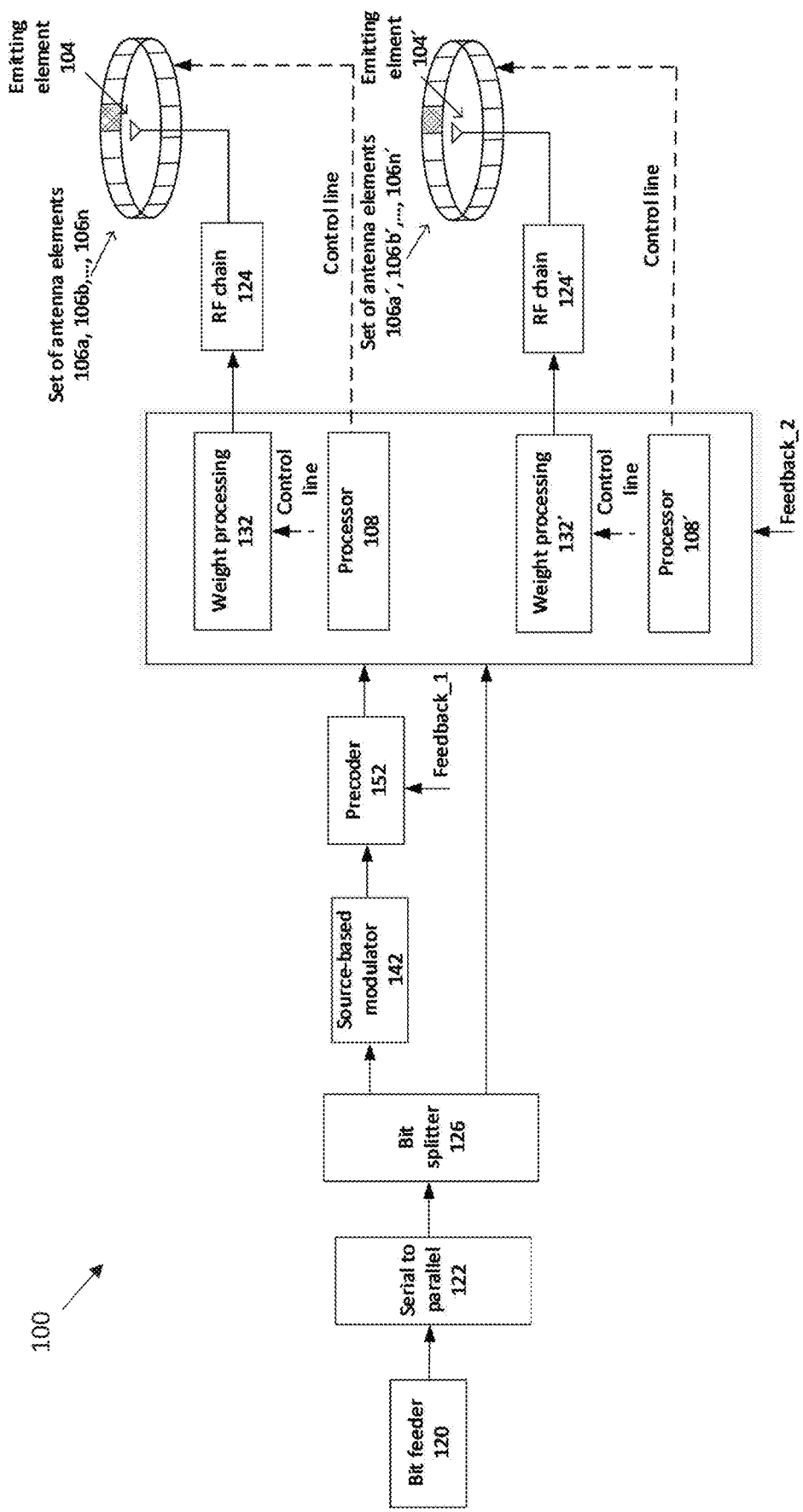
FIG. 10 illustrates a first communication device employing MIMO according to at least one embodiment.

In embodiments, multiple-input multiple-output (MIMO) is also used which is illustrated in the block diagram in FIG. 10. MIMO systems that use two or more RF chains at the first communication device 100 is augmented by the present solution for further capacity boost. The example in FIG. 10 shows two MIMO branches and corresponding RF chains for simplicity but the first communication device 100 includes any number of suitable MIMO branches.

FIG. 10 shows the first communication device 100 using joint source-based modulation with MIMO. In addition, the first communication device 100 comprises a precoding block 152 arranged between the source based modulation block 142 and the weight processing blocks 132, 132" which are controlled by its respective processors 108, 108" via the dashed control lines. The source modulated bits from the source modulation block 142 are provided to the precoding block 152 which precodes the received symbols. Precoding is adjusted based on the selected radiating pattern or vice versa where the processors 108, 108" is adapted to the choice of precoder. Previous mentioned source modulation is used. Assuming that a symbol point of the source-based modulation carries $m_1$ bits per symbol point. That is, for QPSK and 16QAM $m_1$ is equal to 2 and 4, respectively. The precoding in the first communication device 100 is performed digitally as those in LTE and NR where the receiver, i.e., the second communication device 300, also receives rank indication (RI) and precoding matrix index (PMI). The first communication device 100 based the selection of RI and PMI via the feedback line further adjusts its antenna elements to create a radiating pattern that enhances a given metric for a quality of service (QoS).

A non-limiting example of a MIMO implementation is hereby given for provide better understating of such implementation. Assume that there are two emitting elements 104, 104' such that an emitting element is surrounded by a set of antenna elements as shown in FIG. 10. Next consider two feedback bits sent from the second communication device 300 to the first communication device 100 in control signaling to inform the first communication device 100 to select and activate a suitable activation pattern. This feedback is shown as Feedback_1 in FIG. 10 and is provided to the precoding block 152. The rank transmission, i.e., RI=1, with different PMI is considered. For NR, there are 4 indices with 4 different precoding matrices. We next disclose a design that uses these precoding matrices along with the proposed solution. Toward this end, in the disclosed solution two additional feedback bits are transmitted in control signaling from the second communication device 300 to the first communication device 100 for selection of activation pattern. This feedback is shown as Feedback_2 in FIG. 10 and is provided to the weight processing blocks 132, 132' and its respective processors 108, 108'.

Table 1 shows an example of the design using such NR precoding matrix in MIMO. The first column shows the joint index and there are 4 feedback bits in total that indicate 16 indices as shown in the second column. The first two bits indicates an activation pattern (column 3) and the remaining two bits select the precoding matrix (column 4) by which the modulated symbol obtained by the source-based modulation is precoded using the indicated bits in the feedback.

Figure 11:
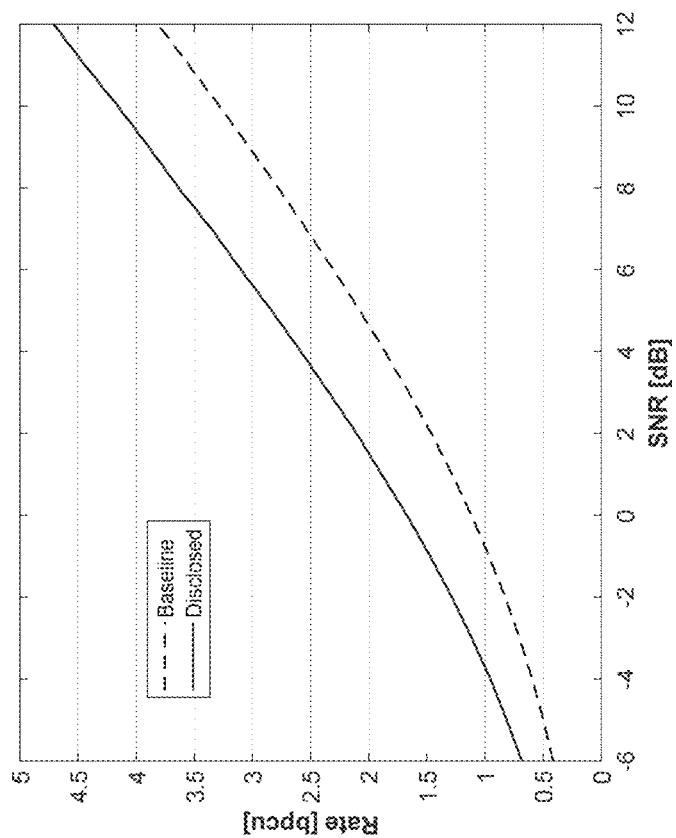
FIG. 11 shows the achievable transmission rate versus SNR according to at least one embodiment.

FIG. 11 shows the rate in bits per channel use (bpcu) as a function of the SNR in dB. The dashed line shows a baseline MIMO scheme with precoding and the full line shows the disclosed solution with precoding. It is observed that the disclosed solution provides multiple dBs of power gain compared to the past solution.

TABLE 1

| Joint index | Feedback bits | Activation pattern | Codebook index | Number of layers $v = 1$ |
|---|---|---|---|---|
| 0 | 0000 | 00 | 0 | $\frac{1}{\sqrt{2}}\begin{bmatrix}1\\1\end{bmatrix}$ |
| 1 | 0001 | 00 | 1 | $\frac{1}{\sqrt{2}}\begin{bmatrix}1\\j\end{bmatrix}$ |
| 2 | 0010 | 00 | 2 | $\frac{1}{\sqrt{2}}\begin{bmatrix}1\\-1\end{bmatrix}$ |
| 3 | 0011 | 00 | 3 | $\frac{1}{\sqrt{2}}\begin{bmatrix}1\\-j\end{bmatrix}$ |
| 4 | 0100 | 01 | 0 | $\frac{1}{\sqrt{2}}\begin{bmatrix}1\\1\end{bmatrix}$ |
| 5 | 0101 | 01 | 1 | $\frac{1}{\sqrt{2}}\begin{bmatrix}1\\j\end{bmatrix}$ |
| 6 | 0110 | 01 | 2 | $\frac{1}{\sqrt{2}}\begin{bmatrix}1\\-1\end{bmatrix}$ |
| 7 | 0111 | 01 | 3 | $\frac{1}{\sqrt{2}}\begin{bmatrix}1\\-j\end{bmatrix}$ |
| 8 | 1000 | 10 | 0 | $\frac{1}{\sqrt{2}}\begin{bmatrix}1\\1\end{bmatrix}$ |
| 9 | 1001 | 10 | 1 | $\frac{1}{\sqrt{2}}\begin{bmatrix}1\\j\end{bmatrix}$ |
| 10 | 1010 | 10 | 2 | $\frac{1}{\sqrt{2}}\begin{bmatrix}1\\-1\end{bmatrix}$ |
| 11 | 1011 | 10 | 3 | $\frac{1}{\sqrt{2}}\begin{bmatrix}1\\-j\end{bmatrix}$ |
| 12 | 1000 | 11 | 0 | $\frac{1}{\sqrt{2}}\begin{bmatrix}1\\1\end{bmatrix}$ |
| 13 | 1100 | 11 | 1 | $\frac{1}{\sqrt{2}}\begin{bmatrix}1\\j\end{bmatrix}$ |
| 14 | 1101 | 11 | 2 | $\frac{1}{\sqrt{2}}\begin{bmatrix}1\\-1\end{bmatrix}$ |
| 15 | 1110 | 11 | 3 | $\frac{1}{\sqrt{2}}\begin{bmatrix}1\\-j\end{bmatrix}$ |

Figure 12:
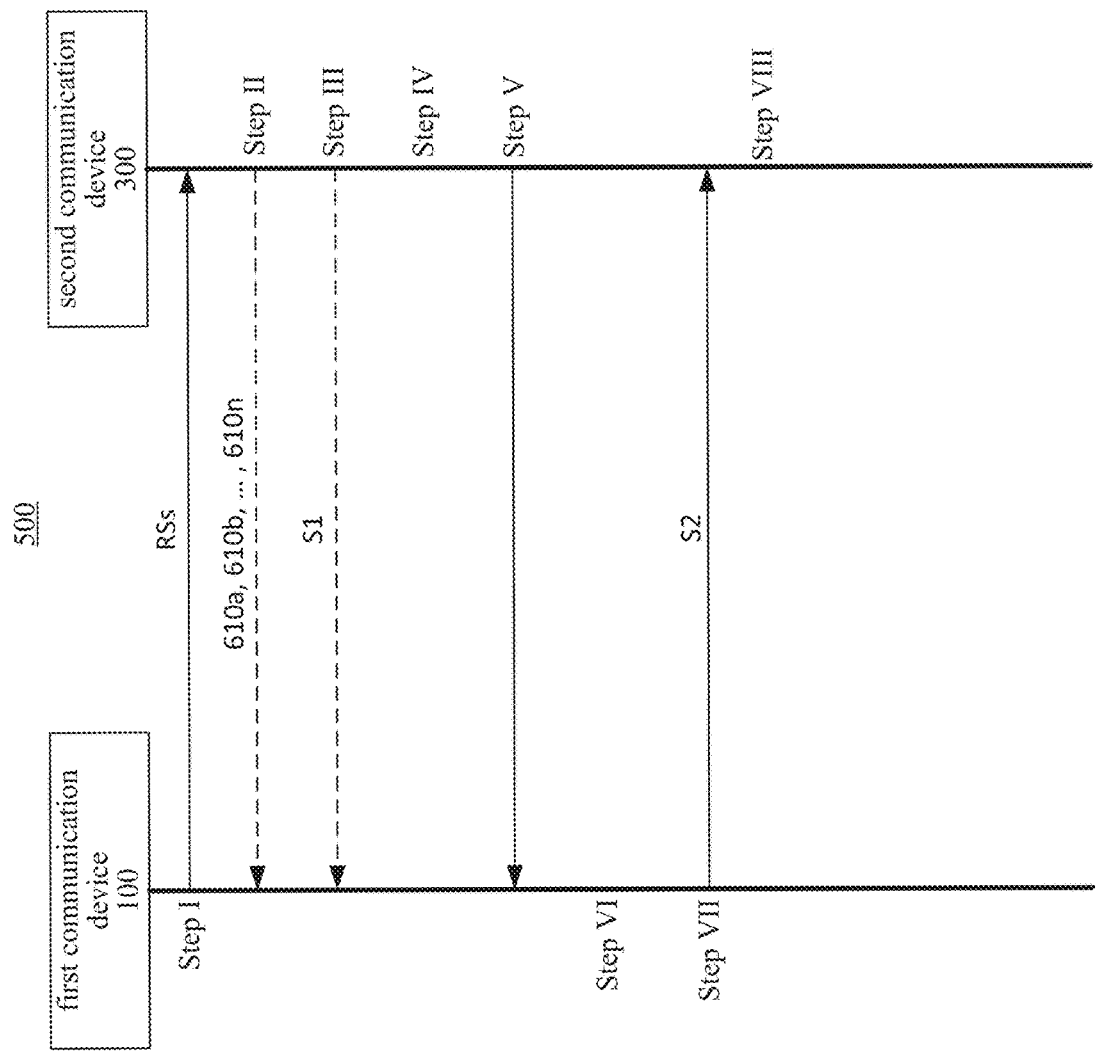
FIG. 12 shows a signaling diagram illustrating interaction between a first communication device and a second communication device according to at least one embodiment.

FIG. 12 shows a signaling diagram illustrating the interaction between the first communication device 100 and the second communication device 300 in a communication system 500 according to at least one embodiment.

In step I in FIG. 12, the first communication device 100 transmits a set of reference signals (RSs) or a set of pilots corresponding to a set of radiating patterns (or activation patterns) to the second communication device 300. In general terms the first communication device 100 transmits at least one reference signal or pilot for a radiating pattern in the set of radiating patterns for the set of antenna elements. Non-limiting examples of reference signals are sounding reference signal (SRS), demodulation reference signal (DMRS) or channel state information reference signal (CSI-RS). New reference signals just for this particular application are also envisaged to be included for future standards, e.g., mirror state information reference signal (MSI-RS) that is designed for this particular application. The RSs is transmitted using various sequences. One example includes mutually orthogonal sequences that are transmitted in time or frequencies in addition to the code-division of the pilot sequences. The use of cover codes that depends on the antenna elements is also considered. The pilots are transmitted for a subset of the activation patterns or a subset of antenna elements to reduce the pilot overhead. Note that we could have the RSs transmitted in the other directions from the second communication device 300 to the first communication device 100 to perform the same procedure. This approach is more useful in response to having time-division duplex or partial reciprocity in frequency-division duplex where the partial reciprocity for UL and DL holds for angles and the delays of the channels.

In case of PIN diode implemented antenna elements as previously described, denote the set of radiating patterns by $\{\pi_i\}_{i=1}^{2^m}$ where m is number of total PIN diodes that are switched on and off independently and $\pi_i$ is a binary sequences of length m where 1 represents that the PIN diode is switched on and 0 indicates the case where the PIN diode of a given mirror is switched off. In response to an antenna element having PIN diodes that switch on and off independently, then m≤M where M is the total number of antenna elements. Therefore, for this implementation, one could use $2^m$ pilot signals that are time-multiplexed to enable the channel estimation for radiating patterns. The first communication device 100 decides to transmit the pilots only for a subset of the radiating patterns to reduce the overhead such that the second communication device 300 obtains the symbol constellation by other signal processing methods such as interpolations.

In step II in FIG. 12, the second communication device 300 estimates the radio channel for a radiating pattern in the set of radiating patterns based on the received set of reference signals. The estimated channel for a radiating pattern represents a constellation symbol in a received symbol constellation.

In embodiments, the second communication device 300 optionally signals the channel estimations 610a, 610b, ..., 610n directly to the first communication device 100, illustrated with the dashed arrow extending from box II. In this case the following steps III-V in FIG. 12 are not performed by the second communication device 300. The signaling of the channel estimations 610a, 610b, ..., 610n is an indication of the channel estimations, e.g., mapped to a table, indexed by binary bit string, or compressed or differentially indicated based on earlier channel estimations signaled to the first communication device 100.

In step III in FIG. 12, the second communication device 300 computes the first symbol constellation also known as baseline signal space constellation. Denote the set of symbol points for radiating pattern as $\{s_i\}_{i=1}^{2^m}$ where symbol point $s_i$ corresponds to the radiating pattern $\pi_i$ for i=1, 2, ..., $2^m$. Note that we use the notation $s_i$ even though it also represents the channel from the transmitted configured with the radiating pattern $\pi_i$ as it is in fact also the transmitted signal shaped by a particular configuration (or activation pattern) of the antenna elements. The set $\{s_i\}_{i=1}^{2^m}$ is also understood as the symbol constellation in the symbol space.

Optionally, the second communication device 300 signals the first symbol constellation S1 (the set $\{s_i\}_{i=1}^{2^m}$) directly to the first communication device 100 illustrated with the dashed arrow extending from box III. In such case steps IV and V are not performed by the second communication device 300.

Figure 13:
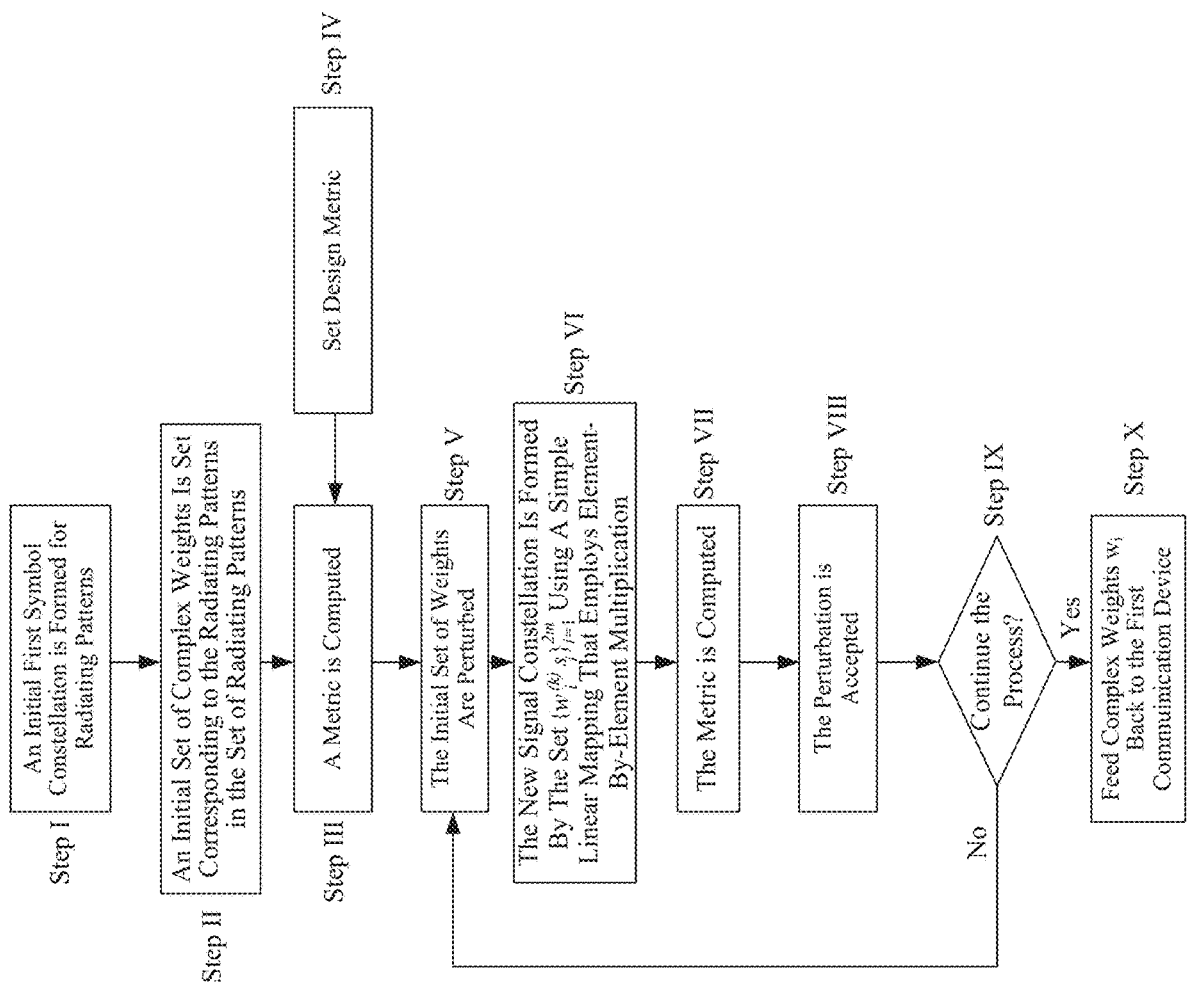
FIG. 13 shows a flow chart of an algorithm for computing a set of weights according to at least one embodiment.

In step IV in FIG. 12, the second communication device 300 using the knowledge of the first symbol constellation $\{s_i\}_{i=1}^{2^m}$ computes a set of complex weights $\{w_i\}_{i=1}^{2^m}$ subject to a power constraint. FIG. 13 shows a flow chart how the set of weights are computed more in detail. Having computed the set of complex weights $w_i$ for i=1, 2, ..., $2^m$ symbols at the second communication device 300 is represented by the set expressed as $\{w_i s_i\}_{i=1}^{2^m}$. The purpose of the set of complex weights is to shape the received symbol constellation such that the set of symbols $\{w_i s_i\}_{i=1}^{2^m}$ possesses better features that enable a transmission with better quality of service.

In step V in FIG. 12, having computed the set of complex weights, the second communication device 300 provide feedback signaling to indicate the computed set of complex weights $\{w_i\}$ for i=1, 2, ..., $2^m$ to the first communication device 100.

In at least one embodiment, a low feedback signaling overhead is provided. To enable this, the feedback signaling is compressed to reduce overhead. In embodiments, the feedback is formed and represented by binary strings containing just few bits. Assume that in its simplest from that the second communication device 300 obtains one radiating pattern for the antenna elements so in response to there being m total radiating patterns for the system with $N_t$ antennas with RF chains, the feedback overhead becomes $mN_t$ bits. That is, for two transmitter antennas with 2 radiating patterns use 2 bits of feedback from the second communication device 300 to the first communication device 100 to configure the first communication device 100.

In step VI in FIG. 12, the first communication device 100 obtains a second symbol constellation based on the set of weights received from the second communication device 300 and a first symbol constellation.

In embodiments, the first communication device 100 obtains the second symbol constellation by mapping the first symbol constellation onto the set of weights to obtain the second symbol constellation. The mapping is linear mapping. One simple example of linear mapping is the element-wise multiplication of the weights with the first symbol constellation to generate the second symbol constellation.

In embodiments, after mapping the first symbol constellation onto the set of weights perform power control and phase shift to obtain the second symbol constellation.

In embodiments, the second symbol constellation is any of M-PSK, e.g., BPSK and QPSK, or M-QAM, e.g., 16-QAM and 64QAM, where M is a positive integer. The set of weights are computed such that symbols in the second symbol constellation form a legacy symbol constellation to make the transmission accessible to another legacy receiver of the second communication device 300. Other examples are the weights that are obtained such that the new symbol constellations have an enhanced shaping-gain (which is known in the coding theory and is achieved for example by optimization of the location constellation points in the signal space or the probability distribution of the signal points). The weights are also obtained such that the new symbol constellations are generated to form a multi-dimensional lattices that have a generator matrix with a fundamental parallelotope. The properties of the lattices are optimized using the weights that make them suitable for certain channel conditions.

In step VII in FIG. 12, the first communication device 100 transmits a set of information bits mapped onto the computed second symbol constellation S2 from step VI to the second communication device 300.

In step VIII in FIG. 12, the second communication device 300 receives the set of information bits mapped onto the computed second symbol constellation S2. The second communication device 100 thereafter performs demodulation and decoding of the received information based on the second symbol constellation and the used bit-to-symbol mapping.

In embodiments the first communication device 100 however obtains the set of weights in alternative ways instead of receiving them directly from the second communication device 300.

In embodiments, the first communication device 100 receives a set of channel estimations 610a, 610b, ..., 610n from a second communication device 300 which corresponds to the optional transmission at step II in FIG. 12. A channel estimation corresponds to a radiating pattern 600i in the set of radiating patterns 600a, 600b, ..., 600n. The first communication device 100 further computes the set of weights based on one channel estimation 610n in the set of channel estimations 610a, 610b, ..., 610n and the first symbol constellation.

In embodiments, the first communication device 100 receive a set of reference signals associated with the set of radiating patterns from a second communication device 300 (not shown in FIG. 12) and determines a set of channel estimations 610a, 610b, ..., 610n based on the received set of reference signals. A channel estimation corresponds to a radiating pattern in the set of radiating patterns. The first communication device 100 thereafter computes the set of weights based on a channel estimation in the set of channel estimations. This case hence relates to the example in response to the second communication device 300 transmitting reference signals instead of the first communication device 100 for estimating the radio channel as illustrated in FIG. 12. This is possible since the antenna elements are reciprocal in terms of transmission and reception of RF signals.

Moreover, the first communication device 100 also obtains the first symbol constellation in different ways.

In embodiments, the first communication device 100 receives a set of channel estimations 610a, 610b, ..., 610n from the second communication device 300 (see step II in FIG. 12). A channel estimation corresponds to a radiating pattern 600i in the set of radiating patterns 600a, 600b, ..., 600n. The first communication device 100 computes the first symbol constellation based on a channel estimation 610n in the set of channel estimations 610a, 610b, ..., 610n.

In embodiments, the first communication device 100 receives a set of reference signals associated with the set of radiating patterns from the second communication device 300 and determines a set of channel estimations based on the received set of reference signals. A channel estimation corresponds to a radiating pattern in the set of radiating patterns. The first communication device 100 computes the first symbol constellation based on a channel estimation in the set of channel estimations. This case also relates to the example where the second communication device 300 transmits reference signals instead of the first communication device 100 for estimating the radio channel. This is possible since the set of antenna elements are reciprocal in terms of transmission and reception of RF signals.

In embodiments, the first communication device 100 receives the first symbol constellation directly from the second communication device 300 in control signaling as illustrated with the dashed arrow at box III in FIG. 12. The first symbol constellation is, for example, selected from a set of pre-determined codebooks which is known to the first communication device 100 and the second communication device 300. Thereby, only a codebook index has to be signaled thus reducing control signaling overhead.

Furthermore, FIG. 13 shows a flowchart of an algorithm to compute the set of weights more in detail. This algorithm uses a stochastic perturbation method for a given design metric.

In step I in FIG. 13, an initial first symbol constellation is formed for radiating patterns.

In step II in FIG. 13, an initial set of complex weights is set corresponding to the radiating patterns in the set of radiating patterns.

In step III in FIG. 13, a metric is computed. The algorithm sets a design metric and takes the initial signal space formed by the set $\{s_i\}_{i=1}^{2^m}$ as its input and produces a set of complex weights $\{w_i\}_{i=1}^{2^m}$ subject to a power constraint that could e.g., be average or peak power constraints as its output.

The design metric is set in step IV and provided to step III. The design metric includes minimum pairwise distance, e.g. Euclidian distance, or any other related distance measures such as chordal distance that is normally used for noncoherent communications, Shannon capacity, symbol-error-rate, block-error-rate, finite-length capacity, bit-interleaved capacity, outage capacity and shaping gain. Delay constraint as well as reliability also are used as the design metric.

In step V in FIG. 13, the initial set of weights are perturbed. In one example, the weights are perturbed in a stochastic manner such that $$w_i^{(k)} = \alpha_k(w_i^{(k-1)} + \Delta_i^{(k)}), \text{ for } k=1,2,\ldots$$

where $\Delta_i^{(k)}$ denotes the perturbation variable which is selected according to a given random distribution and $\alpha_k$ denotes the power normalization factor. The algorithm first starts with unit weights $w_i^{(0)}=1$ for $i=1, 2, \ldots, 2^m$. That is, for the stage (k), the perturbation $\Delta_i^{(k)}$ is applied to the ith weight found at the earlier selected weight $w_i^{(k-1)}$ associated to the ith signal point. One distribution that is used is to first to select an index from the integer $\{1, 2, \ldots, 2^m\}$ and then for the chosen index we set a uniform circular distribution to choose the perturbation $\Delta_i^{(k+1)}$. The support of the uniform distribution varies over time such that as the algorithm runs the perturbation becomes smaller. For the other unselected indices, no perturbation is applied.

In step VI the new signal constellation (i.e., symbol constellation) is formed by the set $$\{w_i^{(k)} s_i\}_{i=1}^{2^m}$$

using a simple linear mapping that employs element-by-element multiplication.

In step VII, the metric is computed. To exemplify, consider the minimum pairwise Euclidian distance as the objective function. The objective function is recomputed $$d_k = \min_{\forall i \neq j} |w_i^{(k)} s_i - w_j^{(k)} s_j|$$

In step VIII, the perturbation is accepted in response to the perturbation producing larger minimum distance, i.e., $d_k > d_{k-1}$, otherwise a new random perturbation is chosen until the design metric is enhanced.

In step IX, the process is continued, i.e., the NO branch in FIG. 13, until there is no significant change in the metric or the total numbers of trials selected for the optimization is exhausted. Otherwise, the YES branch in FIG. 13 is selected and step X is executed.

In step X, having found the complex weights $w_i$ for $i=1, 2, \ldots, 2^m$, these weights or (a signal indicating these weights) are fed back to the first communication device 100. The new symbol constellation at the second communication device 300 is represented by the set $\{\hat{w}_i s_i\}_{i=1}^{2^m}$ where $\{\hat{w}_1, \hat{w}_2, \ldots, \hat{w}_{2^m}\}$ is the set of weights.

Figure 14:
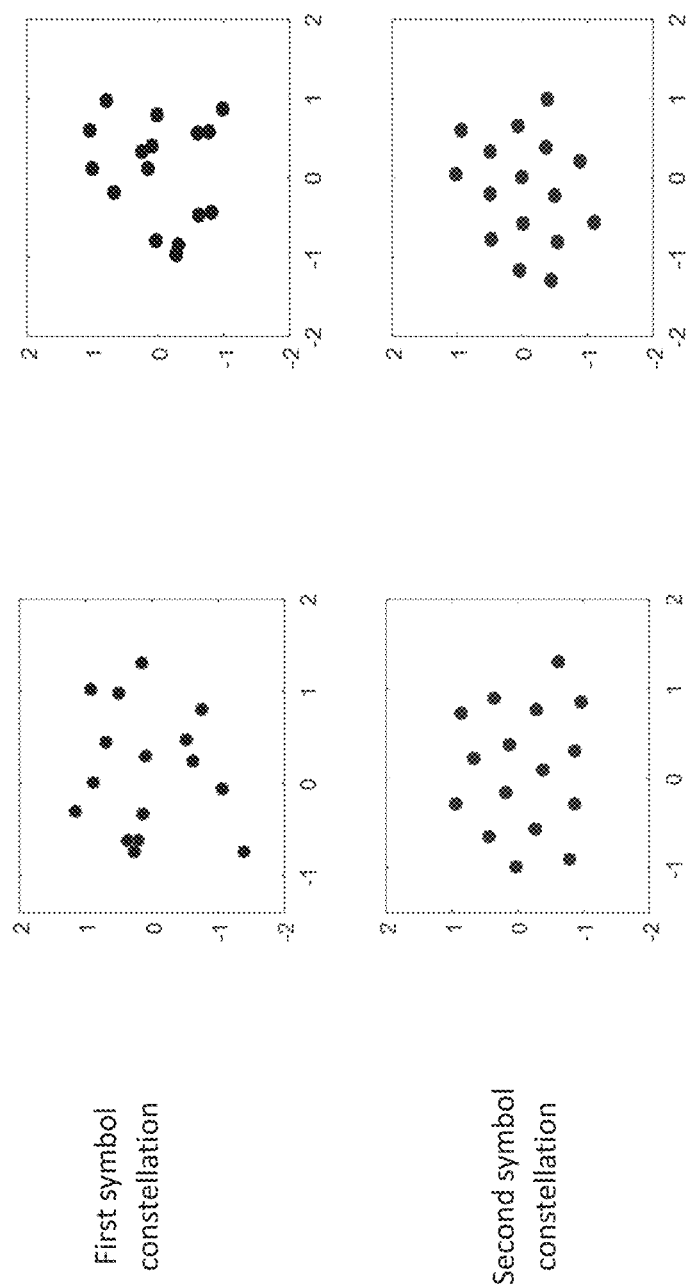
FIG. 14 illustrates shaping symbol constellations according to at least one embodiment.

FIG. 14 illustrates two examples of the herein disclosed solution for shaping the symbol constellation. In these examples, there are four antenna elements whose PIN diodes are switched on and off independently; i.e. m=4, which results to a signal constellation with $2^m=16$ points. The first symbol constellation is denoted by $\{s_i\}_{i=1}^{2^m}$ and the second symbol constellation is denoted by $\{\hat{w}_i s_i\}_{i=1}^{2^m}$, where $\{\hat{w}_i\}_{i=1}^{2^m}$ is the set of weights that are computed using an algorithm by maximizing the minimum pairwise distance subject to a power constraint. It is assumed that channel from an antenna element to the second communication device 300 follows Rayleigh fading with unit variance. From these examples in FIG. 14, the first symbol constellation has a small minimum pairwise distance and the symbol points are irregular distributed on the two-dimensional plane. This is shown in the two upper drawings However, the disclosed solution by introducing a set of weights shapes the first symbol constellation in a favorable manner according to a design criteria to obtain the second symbol constellation. Since the minimum pairwise distance was selected as the design metric, the algorithm works in a way that it places symbols in the second symbol constellation on almost a triangular grid that has much better minimum pairwise distance as shown in the two lower drawings.

Figure 15:
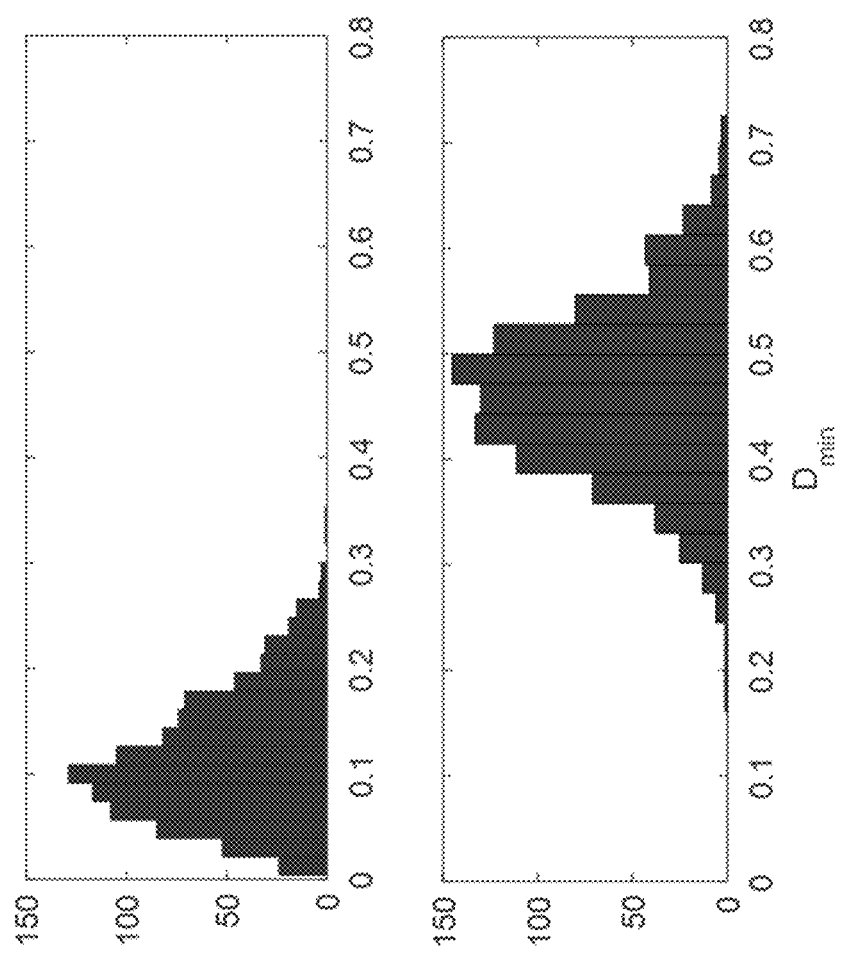
FIG. 15 shows the distribution of the minimum pairwise distance for a population of symbol constellations according to at least one embodiment.

FIG. 15 shows the distribution of the minimum pairwise distance for a population of a symbol constellation according to a past solution and the disclosed solutions. In this example, there are four antenna elements whose diodes are switched on and off independently; i.e. m=4, which gives a symbol constellation with $2^m=16$ points. It is assumed that the radio channel from an antenna element to the second communication device 300 follows Rayleigh fading with unit variance.

The top diagram in FIG. 15 shows the distribution of $$D_{min,baseline} = \min_{\forall i \neq j} |s_i - s_j|$$

where $\{s_i\}_{i=1}^{2^m}$ denotes a symbol constellation according to a past solution.

The bottom diagram in FIG. 15 on the other hand shows the distribution of $$D_{min,disclosed} = \min_{\forall i \neq j} |\hat{w}_i s_i - \hat{w}_j s_j|$$

where $\{\hat{w}_i s_i\}_{i=1}^{2^m}$ denotes the disclosed solution such that $\{\hat{w}_i\}_{i=1}^{2^m}$ is the set of weights that are computed using the algorithm for maximizing the minimum pairwise distance subject to a power constraint given in FIG. 13. From FIG. 15 the past solutions has smaller minimum pairwise distance with a notable probability while the disclosed solution has much higher minimum pairwise distance. This illustrates that the disclosed solution enables symbol constellations that have much better features which in turn leads to a higher quality of service.

Figure 16:
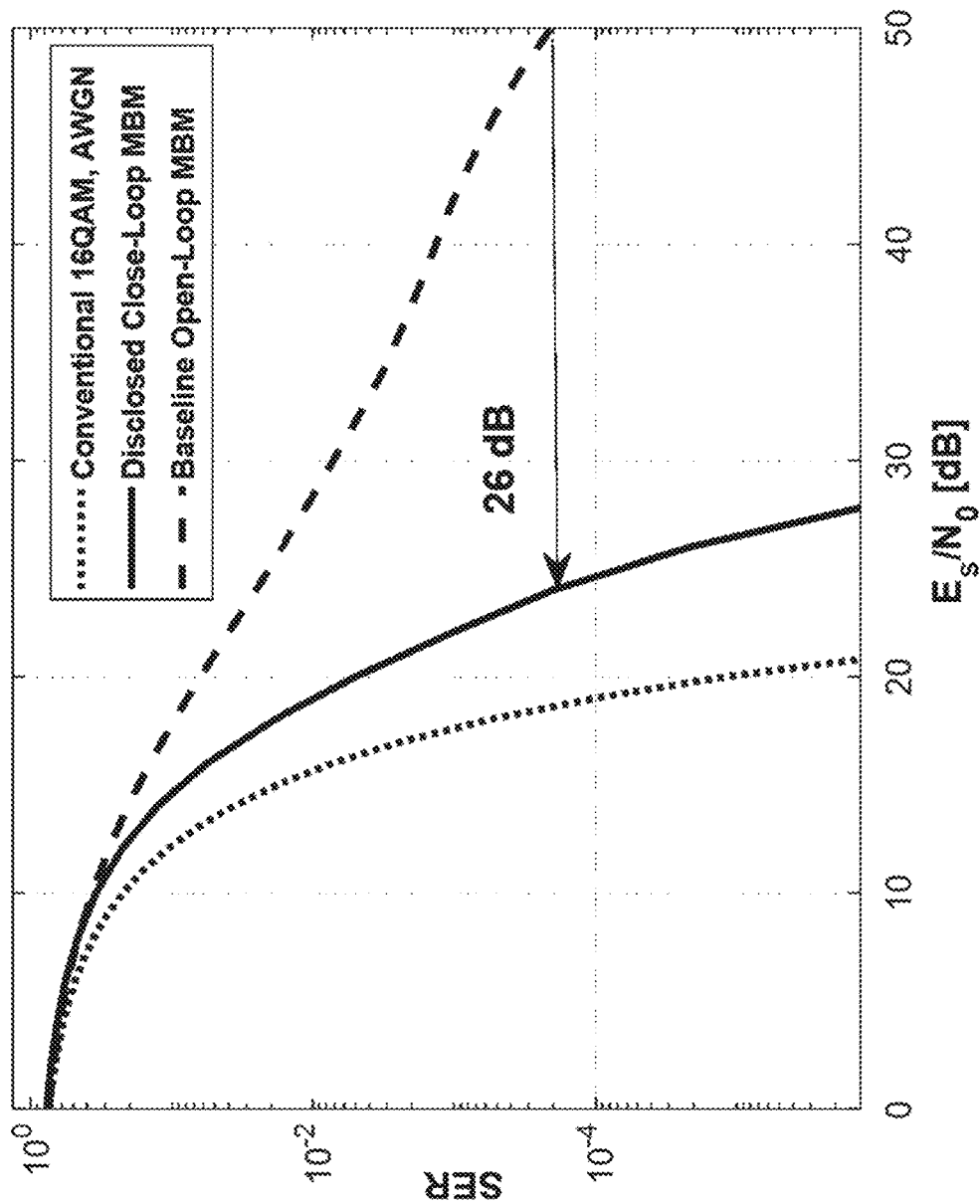
FIG. 16 shows performance of transmission schemes according to at least one embodiment.

FIG. 16 shows the symbol error probability (SER) in relation to the signal-to-noise ratio (Es/No) of three different transmission schemes.

Scheme 1 is a baseline open-loop MBM according to past solutions in which there are four antenna elements whose diodes are switched on and off independently; i.e. m=4, which gives a symbol constellation with $2^m=16$ points. It is assumed that channel from an antenna element to the receiver follows independent Rayleigh fading with unit variance with AWGN noise at the receiver. Scheme 2 is a disclosed close-loop MBM according to embodiments similar to that of scheme 1, in which there are four antenna elements whose diodes that are switched on and off independently; i.e. m=4, which gives a symbol constellation with $2^m=16$ points but the transmitter configures the weight for channel variation. It is assumed that channel from a mirror to the receiver follows Rayleigh fading with unit variance. Scheme 3 is a 16QAM modulation over AWGN and is considered the benchmark.

From FIG. 16, it is concluded that the disclosed solution improves notably the baseline MBM scheme which at low SER it attains tens of dBs power gain. It additionally the disclosed solution operates close to the AWGN channel.

Figure 17B:
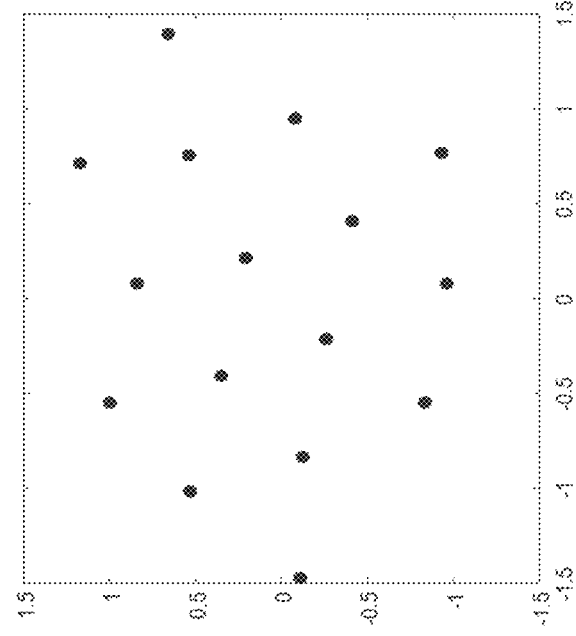
FIGS. 17a-17d illustrates shaping of symbol constellations using a set of weights according to at least one embodiment.
Figure 17D:
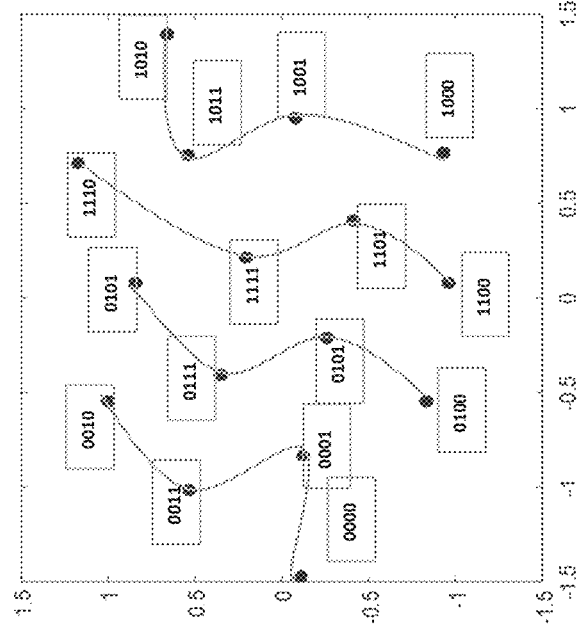
Figure 17A:
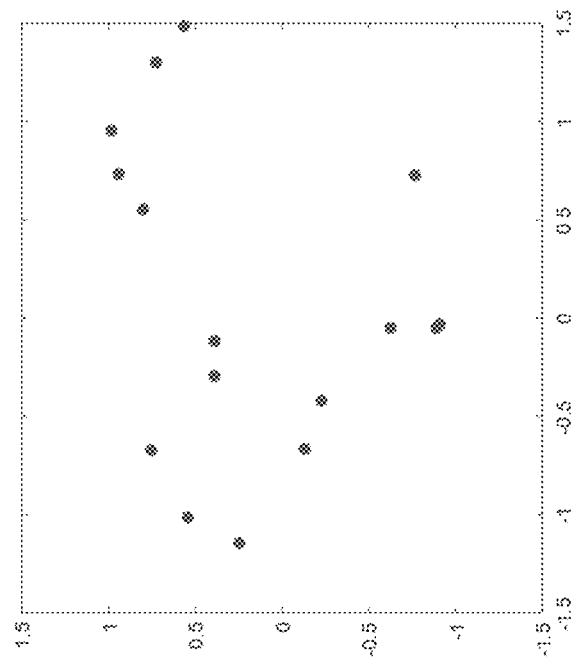
Figure 17C:
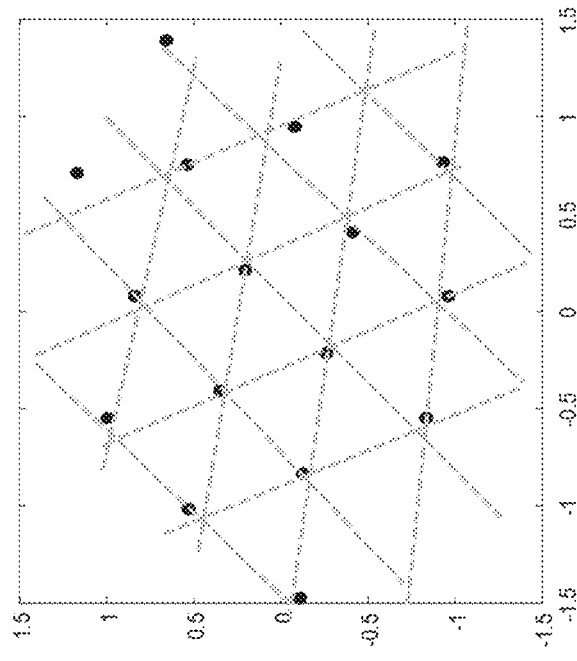

Moreover, in the following disclosure, transmission of low density parity check (LDPC) coded bits using past solutions is considered. In the following, it is assumed that the transmitter has four antenna elements whose PIN diodes that are switched on and off independently; i.e. m=4. This results to a symbol constellation with $2^m=16$ points. The symbol constellation according to the past solutions is denoted by $\{s_i\}_{i=1}^{2^m}$ and the disclosed symbol constellation is denoted by $\{\hat{w}_i s_i\}_{i=1}^{2^m}$ where $\{\hat{w}_i\}_{i=1}^{2^m}$ is the set of weights that are computed using the algorithm by maximizing the minimum pairwise distance subject to the power constraint. FIG. 17a shows the symbol space in response to there not being a set of weights used and FIG. 17b shows the symbol space for disclosed solution in response to the set of weights $\{\hat{w}_i\}_{i=1}^{2^m}$ being employed to shape the first symbol constellation. The symbol points of the second symbol constellation lay on the two-dimensional triangular grid as shown in FIG. 17c.

To enable transmission of bits, bits-to-symbol mapping is to be determined. One approach is to use the perturbation methods such that the design metric is the hamming distance of the bit label to the closet neighbors is minimized. The perturbation is by starting with an initial random mapping and then performing a random bit-flipping. Other methods of optimization are also applied. FIG. 17d shows an example of the results obtained by perturbations. The mapping is described such that the symbols are grouped such that they are located on separable lines and then assign two bits to a line and two additional bits to distinguish symbols on a line. That is, the string $b_0 b_1 b_2 b_3$ is assigned such that $b_0 b_1$ indicates one of the four lines and $b_2 b_3$ determines one of four symbol points on a line. It has also been observed that the obtained symbol constellation using this method gives some edge points. The rotation of these edge points provides enhanced performance by allowing to find better bit-to-symbol mapping as illustrated in FIGS. 18a and 18b.

Figure 18B:
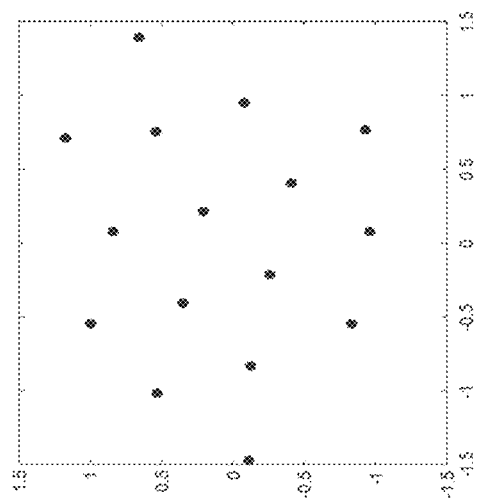
FIGS. 18a and 18b illustrates rotation of edge points in symbol constellations according to at least one embodiment.
Figure 18A:
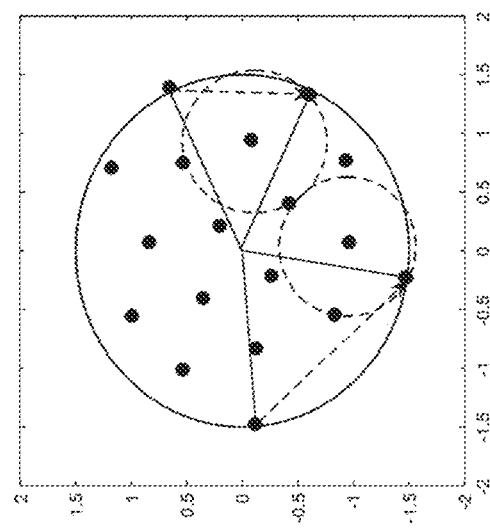

FIG. 18b illustrates a second symbol constellation after applying initial weights and FIG. 18a shows the same constellation with rotated edge points. FIG. 18a shows a symbol constellation in response to the two edge points being encircled in which the rotation angles for the corresponding symbol points are computed and the corresponding weights are re-adjusted. It is noted that the rotation does not change the transmit power.

Figure 19:
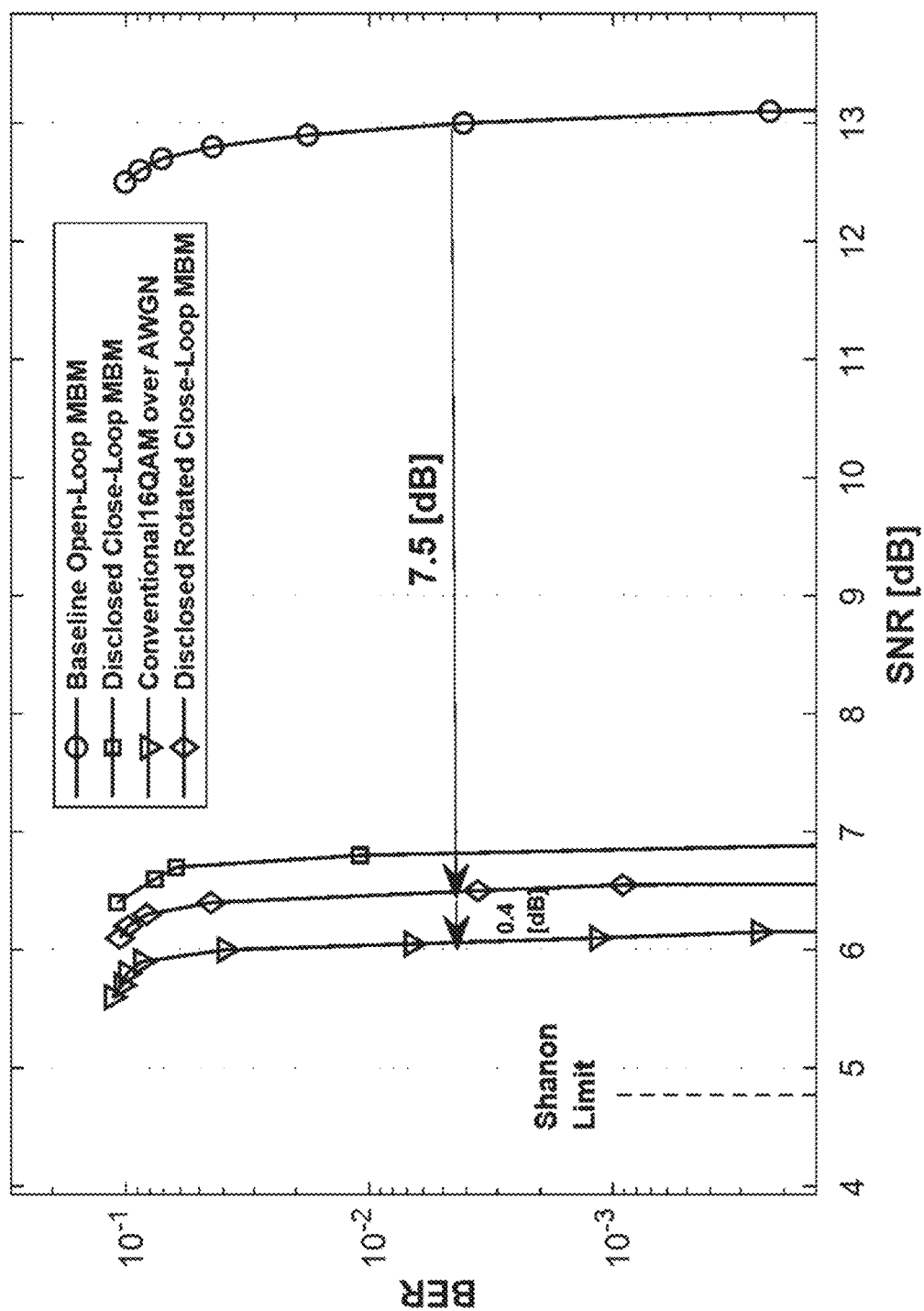
FIG. 19 shows performance results for different solutions according to at least one embodiment.

FIG. 19 shows the bit error probability (BER) as a function of SNR in dB for four LDPC transmission codes scheme in response to the code rate being half, i.e.: baseline open-loop MBM according to past solutions, disclosed close-loop MBM according to embodiments, disclosed close-loop MBM with rotated edge points according to embodiments and a past solution with 16QAM over AWGN as a benchmark. The Shannon limit is also shown. From FIG. 19 it is concluded that the disclosed solution improves notably the baseline MBM scheme with multiple dBs of power gain which enable significant energy saving. Alternatively, the solution is used for extended coverage. The rotation of the edge points further boost the performance and make the disclosed solution operate nearly as that of 16QAM transmission over the AWGN channel.

In at least one embodiment, the fading channel is converted to AWGN channel. That is, channel hardening is achieved by removing the randomness in the effective radio channel by using the weights such that the fading is used for data transmission. At least one embodiment enables symbol shaping to provide channel hardening by converting fading channel to AWGN channel yet controlling fading for data transmission.

Furthermore, any method according to at least one embodiment is implemented in a computer program, having code means, which in response to being run by the processing means causes the processing means to execute the steps of the method. The computer program is included in a computer readable medium of a computer program product. The computer readable medium includes essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

According to embodiments, the present disclosure provides a chip, and the chip is used for a first communication device and/or a second communication device. The chip includes at least one communications interface, at least one processor, and at least one memory, where the communications interface, the processor, and the memory are interconnected by using a circuit (or by using a bus in some cases), and the processor invokes an instruction stored in the memory to perform the method according to at least one embodiment.

According to embodiments, the present disclosure provides a first communication device and/or a second communication device which includes a memory and a processor. The memory is configured to store a program instruction, and the processor is configured to invoke the program instruction in the memory, to implement a function of the first communication device and/or a second communication device according to at least one embodiment.

According to embodiments, the present disclosure provides a non-volatile storage medium, and the non-volatile storage medium stores one or more pieces of program code. In response to a first communication device and/or a second communication device executing the program code, the first communication device and/or a second communication device performs a related method step performed by the first communication device and/or a second communication device according to at least one embodiment.

Moreover, it is realized by the skilled person that embodiments of the first communication device 100 and the second communication device 300 includes the communication capabilities in the form of e.g., functions, means, units, elements, etc., for performing the solution. Examples of other such means, units, elements and functions are: processors, memory, buffers, control logic, encoders, decoders, rate matchers, de-rate matchers, mapping units, multipliers, decision units, selecting units, switches, interleavers, de-interleavers, modulators, demodulators, inputs, outputs, antennas, amplifiers, receiver units, transmitter units, DSPs, MSDs, TCM encoder, TCM decoder, power supply units, power feeders, communication interfaces, communication protocols, etc. which are suitably arranged together for performing the solution.

Especially, the processor(s) of the first communication device 100 and the second communication device 300 includes, e.g., one or more instances of a Central Processing Unit (CPU), a processing unit, a processing circuit, a processor, an Application Specific Integrated Circuit (ASIC), a microprocessor, or other processing logic that interprets and executes instructions. The expression "processor" thus represents a processing circuitry comprising a plurality of processing circuits, such as, e.g., any, some or all of the ones mentioned above. The processing circuitry further performs data processing functions for inputting, outputting, and processing of data comprising data buffering and device control functions, such as call processing control, user interface control, or the like.

Finally, at least one embodiment is not limited as described above, but also relates to and incorporates embodiments within the scope of the appended independent claims.

The invention claimed is:

1. A first communication device comprising:
a set of antenna elements configured to operate in a set of radiating patterns; and
a processor configured to:
obtain a first symbol constellation based on a radiating pattern in the set of radiating patterns,
obtain a set of weights associated with the first symbol constellation,
obtain a second symbol constellation based on the first symbol constellation and the set of weights, and
control the set of antenna elements according to the radiating pattern in the set of radiating patterns for transmitting a set of information bits mapped onto the second symbol constellation.

2. The first communication device according to claim 1, wherein each antenna element in the set of antenna elements is configured by the processor to operate in multiple radiating states so that the set of antenna elements operates in the set of radiating patterns.

3. The first communication device according to claim 2, wherein the processor arranges the set of antenna elements within a range of an emitting element configured to emit a radio wave, and wherein the set of antenna elements is a set of radio frequency mirrors.

4. The first communication device according to claim 1, wherein the processor obtains the first symbol constellation by
receiving a set of channel estimations from a second communication device, wherein a channel estimation from the set of channel estimations corresponds to the radiating pattern in the set of radiating patterns, and
computing the first symbol constellation based on the channel estimation in the set of channel estimations.

5. The first communication device according to claim 4, wherein processor computes the first symbol constellation by:
computing the first symbol constellation based on the channel estimation in the set of channel estimations and source based modulation.

6. The first communication device according to claim 1, wherein the processor obtains the set of weights by:
receiving a set of channel estimations from a second communication device, wherein a channel estimation from the set of channel estimations corresponds to the radiating pattern in the set of radiating patterns, and
computing the set of weights based on the channel estimation [from the set of channel estimations] in the set of channel estimations and the first symbol constellation.

7. The first communication device according to claim 1, wherein the processor obtains the second symbol constellation by:
mapping the first symbol constellation onto the set of weights to obtain the second symbol constellation.

8. The first communication device according to claim 7, wherein the processor obtains the second symbol constellation by:
after mapping the first symbol constellation onto the set of weights, performing power control and phase shift to obtain the second symbol constellation.

9. The first communication device according to claim 7, wherein the second symbol constellation is any of M-PSK (M-ary Phase Shift Keying) or M-QAM (M-ary Quadrature Amplitude Modulation).

10. A second communication device for a communication system, the second communication device being configured to:
receive a set of reference signals from a first communication device, wherein the set of reference signals is associated with a set of radiating patterns of a set of antenna elements;
determine a set of channel estimations based on the set of reference signals, wherein a channel estimation corresponds to a radiating pattern in the set of radiating patterns;
compute a first symbol constellation based on the channel estimation in the set of channel estimations;
compute a set of weights based on the channel estimation in the set of channel estimations and the first symbol constellation;
transmit the set of weights to the first communication device; and
transmit the first symbol constellation to the first communication device.

11. A method for a first communication device comprising a set of antenna elements configured to operate in a set of radiating patterns; the method comprising:
obtaining a first symbol constellation based on a radiating pattern in the set of radiating patterns;
obtaining a set of weights associated with the first symbol constellation;
obtaining a second symbol constellation based on the first symbol constellation and the set of weights; and
controlling the set of antenna elements according to the radiating pattern in the set of radiating patterns for transmitting a set of information bits mapped onto the second symbol constellation.

12. The method of claim 11, further comprising:
configuring each antenna element in the set of antenna elements to operate in multiple radiating states so that the set of antenna elements operates in the set of radiating patterns; and
arranging the set of antenna elements within a range of an emitting element configured to emit a radio wave, and wherein the set of antenna elements is a set of radio frequency mirrors.

13. The method of claim 11, wherein the obtaining the first symbol constellation includes:
receiving a set of channel estimations from a second communication device, wherein a channel estimation from the set of channel estimations corresponds to the radiating pattern in the set of radiating patterns, and
computing the first symbol constellation based on the channel estimation in the set of channel estimations.

14. The method of claim 11, wherein the obtaining the set of weights includes:
receiving a set of channel estimations from a second communication device, wherein a channel estimation from the set of channel estimations corresponds to the radiating pattern in the set of radiating patterns, and
computing the set of weights based on the channel estimation in the set of channel estimations and the first symbol constellation.

15. The method of claim 11, wherein the obtaining the second symbol constellation includes:
mapping the first symbol constellation onto the set of weights to obtain the second symbol constellation; and
after mapping the first symbol constellation onto the set of weights, performing power control and phase shift to obtain the second symbol constellation.

16. A method for a second communication device, the method comprising:
receiving a set of reference signals from a first communication device, wherein the set of reference signals is associated with a set of radiating patterns of a set of antenna elements;
determining a set of channel estimations based on the set of reference signals, wherein a channel estimation corresponds to a radiating pattern in the set of radiating patterns;
computing a first symbol constellation based on the channel estimation in the set of channel estimations;
computing a set of weights based on the channel estimation in the set of channel estimations and the first symbol constellation;
transmitting the set of weights to the first communication device; and
transmitting the first symbol constellation to the first communication device.

* * * * *